(12) United States Patent
Chen

(10) Patent No.: US 10,319,205 B2
(45) Date of Patent: *Jun. 11, 2019

(54) OCCUPANCY BASED LIGHTING CONTROL TECHNOLOGY AND ITS APPLICATION THEREOF

(71) Applicant: Chia-Teh Chen, Taipei (TW)

(72) Inventor: Chia-Teh Chen, Taipei (TW)

( * ) Notice: Subject to any disclaimer, the term of this patent is extended or adjusted under 35 U.S.C. 154(b) by 0 days.

This patent is subject to a terminal disclaimer.

(21) Appl. No.: 16/040,015

(22) Filed: Jul. 19, 2018

(65) Prior Publication Data

US 2018/0322752 A1   Nov. 8, 2018

Related U.S. Application Data

(63) Continuation of application No. 15/709,589, filed on Sep. 20, 2017, now Pat. No. 10,055,958, which is a continuation-in-part of application No. 15/451,519, filed on Mar. 7, 2017, now Pat. No. 9,799,184, which is a continuation of application No. 14/622,787, filed on Feb. 13, 2015, now Pat. No. 9,626,852.

(51) Int. Cl.

| G08B 13/18 | (2006.01) |
| G08B 13/24 | (2006.01) |
| G08B 13/193 | (2006.01) |
| G08B 13/16 | (2006.01) |
| H05B 33/08 | (2006.01) |
| H05B 37/02 | (2006.01) |

(52) U.S. Cl.
CPC ..... *G08B 13/2491* (2013.01); *G08B 13/1627* (2013.01); *G08B 13/193* (2013.01); *G08B 13/2494* (2013.01); *H05B 33/0854* (2013.01); *H05B 37/0227* (2013.01)

(58) Field of Classification Search
CPC ............ G08B 13/2491; G08B 13/2494; G08B 13/193; G08B 13/1627; H05B 33/0854; H05B 37/00227
USPC ...................... 340/554, 540, 541, 545.3, 500
See application file for complete search history.

(56) References Cited

U.S. PATENT DOCUMENTS

| 6,912,429 B1* | 6/2005 | Bilger ................. G08B 25/008 236/49.3 |
| 9,799,184 B2* | 10/2017 | Chen ................. G08B 13/2491 |
| 10,055,958 B2* | 8/2018 | Chen ................. H05B 33/0854 |
| 2012/0274222 A1* | 11/2012 | Verfuerth ........... H05B 37/0227 315/158 |

(Continued)

*Primary Examiner* — Anh V La

(74) *Attorney, Agent, or Firm* — Li & Cai Intellectual Property (USA) Office

(57) ABSTRACT

This disclosure relates to a method of detecting an occupancy state of a living space for controlling lighting apparatus. The method comprises using a motion sensor to send wave signal and detect echoed signal reflected from a moving human body and using a control circuitry operated with a software program to analyze the echoed signal for establishing a numerical value account. In referring to preset parameters, the software program judges the echoed signal by analyzing time duration and frequency pattern of the echoed signal as an incoming motion, an outgoing motion or a local random motion, such that the numerical value account is accordingly updated to represent actual occupant number for activating the controller circuitry to turn on or turn off the lighting apparatus.

13 Claims, 26 Drawing Sheets

(56) References Cited

U.S. PATENT DOCUMENTS

2012/0313588 A1* 12/2012 Carberry ............ H05B 37/0227
320/134
2016/0189532 A1* 6/2016 Malhotra ............. G08B 29/185
340/506

* cited by examiner

OCCUPANCY BASED LIGHTING CONTROL TECHNOLOGY AND ITS APPLICATION THEREOF

This Application is a continuation application of prior application Ser. No. 15/709,589 filed on Sep. 20, 2017, the entire contents of which are incorporated herein by reference. The application Ser. No. 15/709,589 is a continuation in part application of prior application Ser. No. 15/451,519 filed on Mar. 7, 2017, which issued as U.S. Pat. No. 9,799,184. The Application Ser. No. 15/451,519 is a continuation application of prior application Ser. No. 14/622,787 filed on Feb. 13, 2015, which issued as U.S. Pat. No. 9,626,852.

BACKGROUND

1. Technical Field

The present invention generally relates to a motion sensor technology using wave characteristics of either a microwave or an ultrasonic wave coupled with an application of Doppler Effect for sensing a human motion intrusion and detecting an occupancy state of a living space to control a turned on state or a turned off state of a lighting apparatus such as a LED lamp or any electrical appliances in home automation. In the following, the phrase of "motion sensor" shall mean either microwave motion sensor or ultrasonic motion sensor.

2. Description of Related Art

The detection zone of a passive infrared ray (PIR) sensor disposed in a security light fixture for instance is defined and limited by the angle coverage of its detection lens. Once the detection lens is designed and constructed the space coverage of its detection zone is pretty much defined and the only thing adjustable is just the angle of detection lens and consequently the direction of the detection zone. If a much wider detection coverage is required, for instance 270 degree or even 360 degree horizontal space, two or three PIRs need to be integrated. Additionally if vertical space needs detection then additional PIR (3rd or 4th PIR) may need to be considered. The need to install the detection lens outside of the security light fixture also limits the capacity of artistic design of the lighting arts.

On the other hand, the microwave motion sensor could detect motion signals coming from all different directions without being disrupted by any non-metallic obstacles such as wall, buildings, tree, etc. The penetration makes it possible to install and hide the microwave motion sensor inside the glass or plastic diffuser to improve the artistic design of the lighting arts. The omnidirectional detecting capacity makes the microwave motion sensor a more useful detection device under certain conditions.

However, the high penetration and the spreading capacity of microwave signal are actually untamable when it comes to home lighting application. While the microwave detection method has dual advantages in terms of being able to hide the microwave motion sensor inside the lighting fixture and its detecting capacity is unrestricted by direction or angle of intruding motion. The high penetrating and spreading capacity could easily cause problems for the users in that the light may be unexpectedly activated by the body motion in the next door or neighboring rooms.

Please refer to FIG. 1A, which schematically illustrates a prior art illumination apparatus 9 with a microwave motion sensor 90. The prior art illumination apparatus 9 is composed of a microwave motion sensor 90, an illumination module 92, a mounting module 94 and a light diffuser 96. The prior art microwave motion sensor 90 is composed of a circuit assembly which emits microwave signals and receives echoed microwave signals returning from any moving object(s) in a three dimensional (3D) spherical detection zone. The radius of such three dimensional spherical detection zone is determined by the power level set for the whole circuit assembly.

However, the microwave signal is able to penetrate through any non-metallic barriers, the prior art microwave motion sensor 90 may detect the motions occurring in the neighborhood such as next doors, upstairs or downstairs and consequently the illumination module 92 is unexpectedly turned on. The dotted lines as shown in FIG. 1B represent the detection zone of a 3 dimension spherical space that the microwave sensing unit 90 is able to detect and activate the lighting device to turn on. The wall or ceiling penetration effect is an obvious problem. Although it could be managed to reduce the power of the microwave signals so that the radius of the 3D spherical detection zone is confined to a smaller spherical space to avoid the wall penetration problem. However, it will limit the application of such microwave motion sensor 90.

In addition, please refer to FIGS. 1C, 1D and 1E, U.S. Pat. No. 8,169,356 B2 disclosed a method and apparatus using microwave motion sensors having a reflector 40 for enhanced lookdown ability; the prior art was invented for improving the lookdown detection capacity for a security alarm system. The reflector 40 of said prior art was designed to be positioned far above the microwave radiating elements 30 of the microwave motion sensor therefore the reflector 40 is merely invented for enhancing the lookdown ability to detect the motion intrusion in the lookdown area under the reflector 40. The reflector 40 with a curved shape so designed has no control over the microwave signal transmitting to all other directions except the conic sheltered area SA above the reflector 40.

The distance or the relative position between the bottom piece of microwave radiating elements 30 and the reflector 40 determines the scope of conic sheltered area SA. The sheltered area SA is the cross line space of FIG. 1C above the reflector 40, wherein the microwave signal is banned for detection. In other words, the prior art is an open space detecting device that can detect any motion intrusion from all directions except the limited upper zone sheltered by the reflector 40. As shown in FIGS. 1D and 1E which is cited from the FIG. 1C of the prior art, U.S. Pat. No. 8,169,356 B2, the lowest position of the microwave radiating elements 30 determines the scope of the sheltered area SA (as cross line area in FIG. 1C) above the reflector 40.

The prior art security alarm device with microwave motion sensors is able to detect any motion intrusion occurred in the open space outside the sheltered area SA. In other words, when the security alarm device is used for outdoor application, a bird flying across the upper space outside of the sheltered area SA or a motion from adjacent neighbor may easily trigger the microwave motion sensor to activate the security alarm. Furthermore, when the said security alarm device is applied for indoor application, a motion from next door or upper/lower floor may also trigger the microwave motion sensor to unexpectedly activate the security alarm. In either case, the non-managed microwave detection capacity could create more embarrassment than necessary. It might be the intention of the prior art to use the reflector 40 to enhance the downward microwave signal while using lower level power microwave radiation to reduce the detection range for non-downward space so as to avoid the embarrassment of unnecessary triggering.

SUMMARY

It is one object of the present invention to provide an illumination apparatus with a microwave motion sensor for use in motion detection, intrusion detection or occupancy detection so as to enhance the convenience of the illumination apparatus.

To achieve the foregoing object, the present invention provides a microwave motion sensor having a circuit assembly for intrusion detection in a predetermined space. The microwave motion sensor comprises a control unit, a microwave sensing unit and a microwave confining unit. The microwave sensing unit, for transmitting and receiving a microwave signal, is coupled to the control unit. The microwave confining unit, for managing a detection zone of the microwave signal, has an accommodating space formed inside the microwave confining unit, and the microwave sensing unit being disposed inside the accommodating space. Wherein the circuit assembly is divided into the control unit and the microwave sensing unit, the scope of the detection zone of the microwave signal varies based on the shape or construction of the microwave confining unit and the relative position between the microwave sensing unit and the microwave confining unit.

In one embodiment, the present invention provides an illumination apparatus with a microwave motion sensor, for intrusion detection in a predetermined space. The illumination apparatus with a microwave motion sensor comprises a control unit, a microwave sensing unit, a microwave confining unit and an illumination module. The microwave sensing unit, for transmitting and receiving a microwave signal, is coupled to the control unit. The microwave confining unit, for managing a detection zone of the microwave signal, has an accommodating space formed inside the microwave confining unit, and the microwave sensing unit being disposed inside the accommodating space. The illumination module is coupled to the control unit. Wherein the circuit assembly is divided into the control unit and the microwave sensing unit, the scope of the detection zone of the microwave signal varies based on the shape or construction of the microwave confining unit and the relative position between the microwave sensing unit and the microwave confining unit.

Furthermore, there are two main techniques which have been used for motion detection for activating load(s); the first one is passive infrared ray (PIR) sensing technique and the second one is microwave (MW) sensing technique. Each of these two techniques has its own merits and shortcomings. Because of the untamable wall penetration effect that often causes embarrassment of unexpected activation of load(s), the microwave motion sensors are not as popularly used as the passive infrared ray motion sensor.

The objective of the present invention is to improve the performance of microwave motion sensor such that all the negative features of the current microwave motion sensor are eliminated and converted to positive features while its original merits are retained. The PIR technique detects motion intrusion of infrared ray emitting object based on the movement of infrared ray signal collected by a lens and focused on a surface along the x axis and y axis. The microwave motion sensor on the other hand detects motion intrusion by the frequency changes of reflective microwave compared with the transmitted microwave; in other words, the microwave motion sensor detects a motion by the moving distance change along the z-axis between the moving object and the sensor location (the location of the microwave motion sensor). When an object is approaching the sensor location, the frequency of echoed signal received by the microwave motion sensor features a higher frequency. Contrarily, when an object is leaving the sensor location, the frequency of reflective signal received by the microwave motion sensor features a lower frequency. This is so called the Doppler Effect. The following 4 steps represent the technologies of the present invention developed for resolving the untamable wall penetration problems of the microwave detection signal;

1) Separating the microwave sensing unit (radiator or transceiver) from the circuit structure of the control unit while remaining electrically connected with the control unit. This way the spreading capacity of the microwave signal can be more efficiently controlled and better managed.

2) Positioning the microwave sensing unit (radiator or transceiver) inside a metallic cup with open bottom to confine the microwave detection capacity to a desired area to avoid the unwanted wall penetration effect and to manage the spreading capacity of the microwave signal.

3) Developing an adjustable means to allow position adjustment between the microwave sensing unit and the microwave confining unit such that the scope of the microwave detection zone can be telescopically expanded or contracted.

4) Creating a microwave confining unit composed of a plurality of adjustable metallic reflectors which can be individually or collectively pushed outward to form angle opening(s) in different direction(s) with an effect of allowing the microwave detection capacity to expand in different direction(s) along the direction(s) of angle openings according to the environmental characteristics of user's living space. In other words, the shape and scope dimension of the microwave detection zone can be managed by the users to meet specific requirements of their living spaces.

The microwave sensing unit which includes a microwave transmitting circuit and a microwave receiving circuit is the only radiation source of microwave signal in the whole circuit assembly. In order to be able to efficiently manage the detection behavior of the microwave sensing unit, it is necessary to separate this small microwave sensing unit from the whole circuit assembly (Step 1). Otherwise it is hard to regulate the detection behavior of the microwave signal as the dimension of the control unit is simply too big to manage. The microwave sensing unit is then positioned inside the microwave confining unit which is basically a metallic cup with open bottom for control purpose (Step 2). Because the microwave signal cannot penetrate a metallic wall surrounding the microwave sensing unit, the detection capacity is confined to a zone space under the microwave confining unit with the scope of the detection zone to be determined by the diameter of the open bottom of the metallic cup as well as the relative position between the microwave sensing unit and the microwave confining unit. Since the dimensions of living spaces are different among different users a single size solution of the microwave confining unit is not sufficient to satisfy different demands from end users. If the living space is much bigger, the detection scope becomes relatively too small to perform necessary function for turning on the load upon entering the living space. If the living space is much smaller, the detection space becomes relatively too extensive and the microwave signal could still have the wall penetration effect nearby the lower half of the wall. It is unrealistic to offer different sizes of metallic cups for user' selection as it is too costly and time consuming for users to try and select the right size metallic cup.

To resolve such a problem the technology of Step 3 is introduced; an adjustable means is invented to make the relative position between the microwave confining unit and the microwave sensing unit adjustable such that the scope of the microwave detection zone under the microwave confining unit can be telescopically expanded or contracted. There are two ways to achieve the adjustable function; one way is to make the microwave sensing unit adjustable for moving up or down while keeping the microwave confining unit fixed, the other way is to make the metallic cup (the microwave confining unit) adjustable for moving up or down while keeping the microwave sensing unit fixed. This technology of Step 3 offers the end users the flexibility to adjust the scope of microwave detection zone according to the sizes of their living spaces. The technology of Step 3 can only work efficiently with uniform shaped living spaces such as round, square or polygonal living spaces. For non-uniformed living spaces such as rectangular or oval space the adjustment of Step 3 is limited to the width between two walls forming the hallway space, otherwise the problem of wall penetration effect will resume. The living spaces vary not only in terms of sizes but also in terms of shapes. The technology of Step 3 is not able to manage the variation of shapes effectively. It appears that efforts are still required to deal with the shape issue of the living space before the microwave motion sensor can be considered as a perfect motion detection solution. The detection zone managed by the microwave confining unit needs to resemble to the shape of a living space in order to make the best use of the microwave detection capacity without creating the wall penetration effect. A hallway with rectangular motion path or with long oval shaped motion path would require a different shape of microwave confining unit which could produce a detection zone space matching the shape of hall way motion path. In reality, it is not possible to provide multiple styles of shades for selection by the users. What is really needed is another adjustable means that can be used to form a detection zone resembling to the shape of living space.

The technology of Step 4 provides a good solution for managing the shape as well as the extension of the microwave detection zone. The metallic cup of the microwave confining unit is designed to be a composition of a plurality of metallic reflectors which can be individually or collectively pushed outward to form window openings to allow the microwave signal to pass through the openings and extend its detection capacity along the direction(s) of window(s) opened. Regardless the shape of the living space any combination of window opening(s) can be managed by the users to create a detection zone matching the shapes of their living spaces to optimize the efficiency of microwave detection without the hassle of wall penetration. For instance for a hall way living space with either a rectangular motion path or an oval motion path, the two opposite reflectors or window gates of the metallic cup can be pushed outward to extend the detection capacity along the direction of the motion path while the other reflectors facing the two walls are kept closed to avoid the occurrence of wall penetration. The angle or extent of opening also determines the detection distance along the motion path.

The technology of Step 4 has effectively resolved the last problem for managing the microwave detection capacity. With the employment of the above 4 technologies the microwave motion sensor becomes a perfect solution for performing the job of motion detection. The above technologies have another useful application for developing a low cost occupancy detector which controls the on/off performance of load based on the status of occupancy rather than using a timer to automatically turn off the load performance. The Doppler Effect enables us to recognize whether an object is approaching or leaving the sensor location by judging the frequency deviation of the reflective microwave signal from the originally transmitted microwave signal; a lower frequency indicates the object is leaving the sensor location while a higher frequency indicates the object is approaching the sensor location. The problem is in a living space such as a single entry room there is no way for the microwave motion sensor to differentiate between destination motion signal (entering room or leaving room) and local motion signal (random motions inside the living space).

The above invented technologies offer a capacity to manage the shape of the detection zone such that it becomes possible to differentiate between the destination motion signals (entering room or leaving room) and local signals (random motions inside the living space). The destination motions have a much longer motion path (local detection zone plus extended detection zone) compared with the local motions in the original scope of detection zone (local detection zone) in the living space. Therefore, the signal duration of the reflective microwave by the destination motions is always longer than the signal duration of reflective signal by the local motions in the original detection zone in the living space. The microcontroller of the microwave motion sensor thereby can judge the classification of the reflective signals based on the frequency deviation by the Doppler Effect and the signal duration difference of the reflective signals by the technology of Step 4. If the time duration of a reflective signal is longer than a preset time length, it is recognized as a destination motion, further if the frequency of the reflective signal is higher than the frequency of the transmitted signal, it is recognized as an incoming motion, otherwise it is then recognized as a leaving motion; if the time duration is shorter than a preset time length the reflective signals are considered as local motions inside the living space to be ignored. The Step 3 technology is most useful for any open space motion detection as motions can come from any direction of the open space, the adjustable feature of detection zone enables users to manage motion detection function according to the dimension of the open space which needs intrusion detection. The Step 4 however is most useful for any closed space motion detection and occupancy detection (for instance a basement or a walking closet). For occupancy detection inside a closed space where there is an entry door, what really matters is the detection at the entry point of the entry door. After entering the entry door, there is no more need for motion detection, therefore the diameter of the metallic cup does not need to be wide. The motion path of random motions or local motions inside the room therefore can be managed to be substantially shorter than the motion path of the extended detection zone created by a window gate opened along the direction facing the entry door. With such arrangement, it becomes possible to differentiate the reflective signals between local motions and destination motions. Aside from using the Step 4 technology for occupancy detection there is another way for performing occupancy detection by using the Step 2 technology, wherein the microwave confining unit is further installed with swivel connector on the top end of the microwave confining unit such that the microwave confining unit can be angled outward facing the entry door. By such arrangement the microwave sensing unit will only detect destination motions since there is no motion detection for the local/random motions inside the room.

An occupancy counter (OC) is established in the software program of the microcontroller (MCU) to record the classification of reflective microwave signals; the numerical value of OC represents the number of people remaining in the living space. The OC value is at zero when the living space is unoccupied. When a motion signal is detected, the microwave motion sensor automatically turns on the load, at the same time the value of OC is changed from 0 to 1. When a second motion signal is detected, the microcontroller first compares the duration of the motion signal with the preset time length; if the duration of the motion signal is shorter than the preset time length the motion is classified as a local random motion inside the living space and is therefore ignored; if the duration of the motion signal is longer than a preset time length it is classified as another destination motion, the microcontroller further compares the frequency of the destination motion signal; if the reflective frequency is higher than the transmitted frequency, the microcontroller recognizes it is another incoming motion thereby the occupancy counter adds 1 and update its value to 2. The same process repeats as more persons entering the living space. If however, the reflective frequency is lower than the transmitted frequency the microcontroller recognizes it is an outgoing motion thereby the occupancy counter deducts 1 and updates its value. At any time when the OC value becomes 0 the microcontroller manages to turn off the load accordingly.

The preset reference time length can also be automatically established with a learning subroutine which can be used to measure the actual time length for a person to walk out the room along the departing motion path and after a predetermined delay time period (for instance 3 minutes, could be longer or shorter) with no further motion signal is detected, the last motion is then confirmed as a departing motion and the time length of the last motion is thereby recorded by the microcontroller as the first reference time length; the process will repeat for a few times to collect and form a data base of different time lengths, the microcontroller then selects a time length which is equal to or shorter than the shortest time length in the collected data base for differentiating between the destination motion and the local motion. During the learning period the motion sensor uses a timer mode to turn off the load, after the learning process is completed the microcontroller, having developed a necessary data base needed, thereby switches the turn off control from timer mode to occupancy detection mode with the load to be turned off at time when the occupancy becomes zero.

The detection system of the present invention also has an automatic correction function designed to correct a wrong judgment; if for whatever reason, the occupancy counter makes a wrong calculation to show a value of zero while a person is still in the living space, the microcontroller may manages to turn off the light but because the person remaining in the local detection zone will reactively generates a random motion in the original detection zone responding to the turn off, the microcontroller thereby acts to turn light back on, at the same time the OC is changed from 0 to 1 from here the system resumes to normal process that two conditions are required to cause the microcontroller to turns off the light; the signal duration needs to be longer than the preset time length and the frequency of the motion signal needs to be lower than the transmitted frequency.

The occupancy detection technology of the present invention can be expanded to a home/office occupancy detecting system where a plurality of local occupancy detectors at each exit are wirelessly coupled to a cloud or central occupancy control unit, to consolidate the incomings and outgoings through different exits to determine the occupancy status of the office/house for controlling the load performance.

There are other prior arts in the field of occupancy detection for professional applications in medical treatment and security guard systems. Most of them use rather complicated technologies including video identification & analytical recognition (US Publication 2014 103133) or laser scan sensing technology (US Publication 2014 1039818) and the costs for making such products are quite expensive.

The present invention is a low cost solution that can be used to develop affordable and useful products to benefit the public with substantial economic value. The adjustable metallic cup only costs a few cents while its application could be very huge in our living improvement and this is the greatest innovation value of the present invention.

In order to further understand the techniques, means and effects of the present disclosure, the following detailed descriptions and appended drawings are hereby referred to, such that, and through which, the purposes, features and aspects of the present disclosure can be thoroughly and concretely appreciated; however, the appended drawings are merely provided for reference and illustration, without any intention to be used for limiting the present disclosure.

BRIEF DESCRIPTION OF THE DRAWINGS

The accompanying drawings are included to provide a further understanding of the present disclosure, and are incorporated in and constitute a part of this specification. The drawings illustrate exemplary embodiments of the present disclosure and, together with the description, serve to explain the principles of the present disclosure.

DESCRIPTION OF THE EXEMPLARY EMBODIMENTS

Figure 1A:
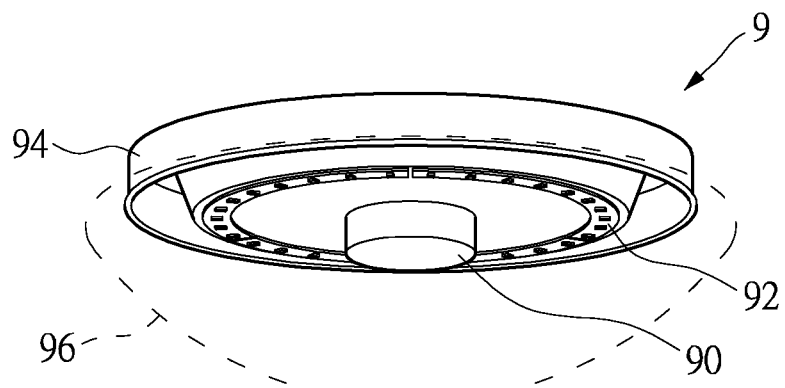
FIG. 1A illustrates a prior art of illumination apparatus with microwave motion sensor.
Figure 1B:
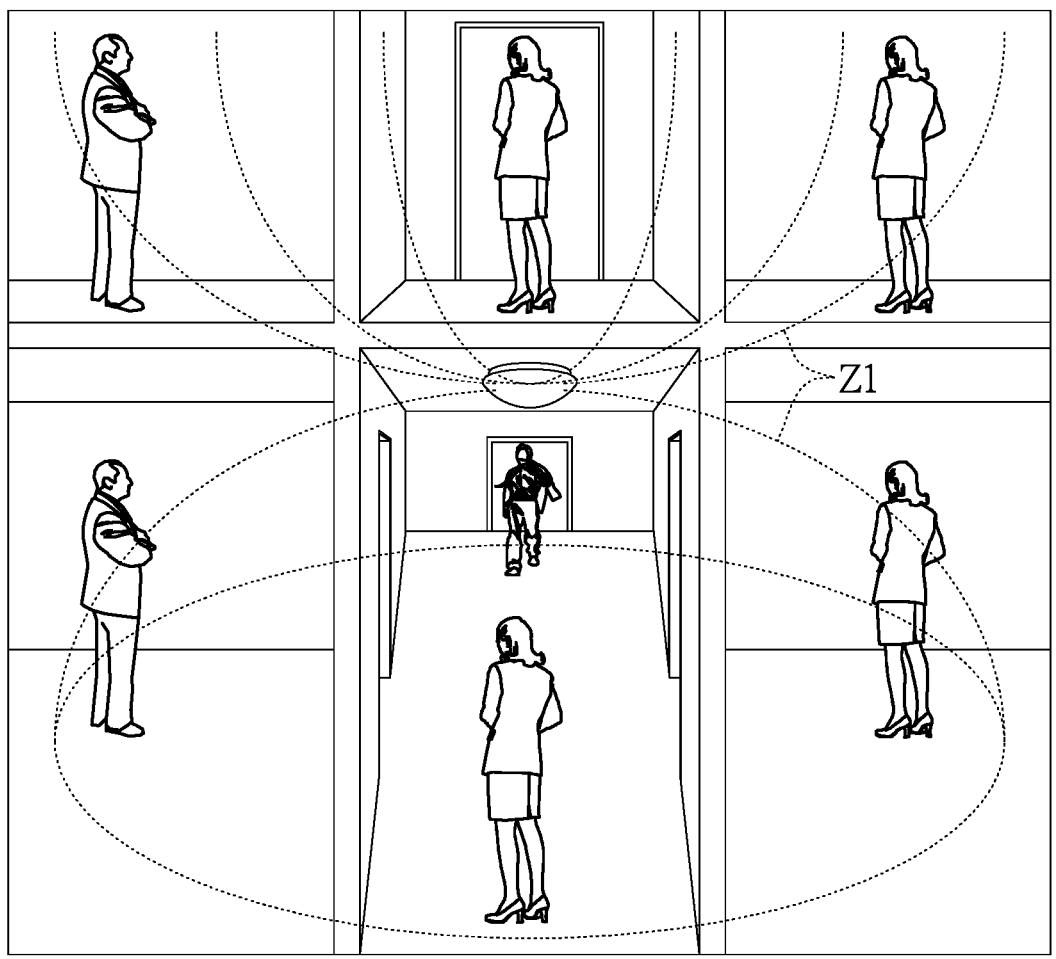
FIG. 1B according to the embodiment of FIG. 1A illustrates a prior art of detection zone of illumination apparatus with microwave motion sensor.
Figure 1C:
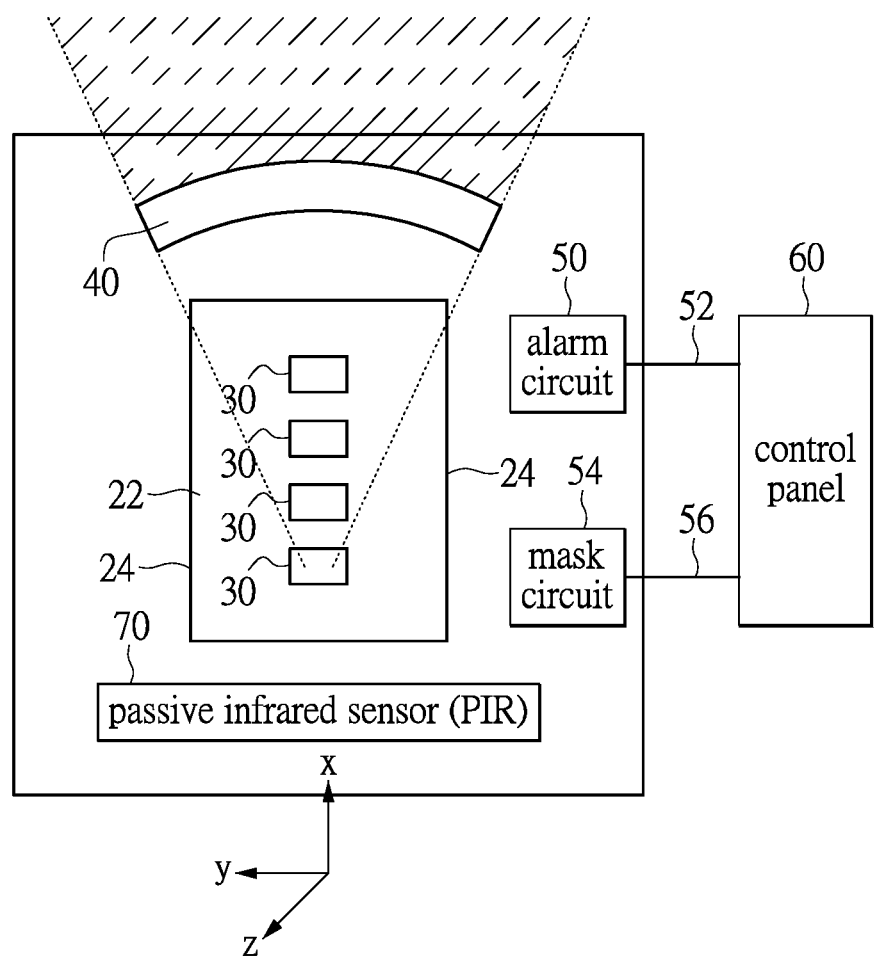
FIG. 1C, FIG. 1D, and FIG. 1E illustrate a prior art of detection zone with a security alarm system using microwave motion sensor to detect intrusion.
Figure 1D:
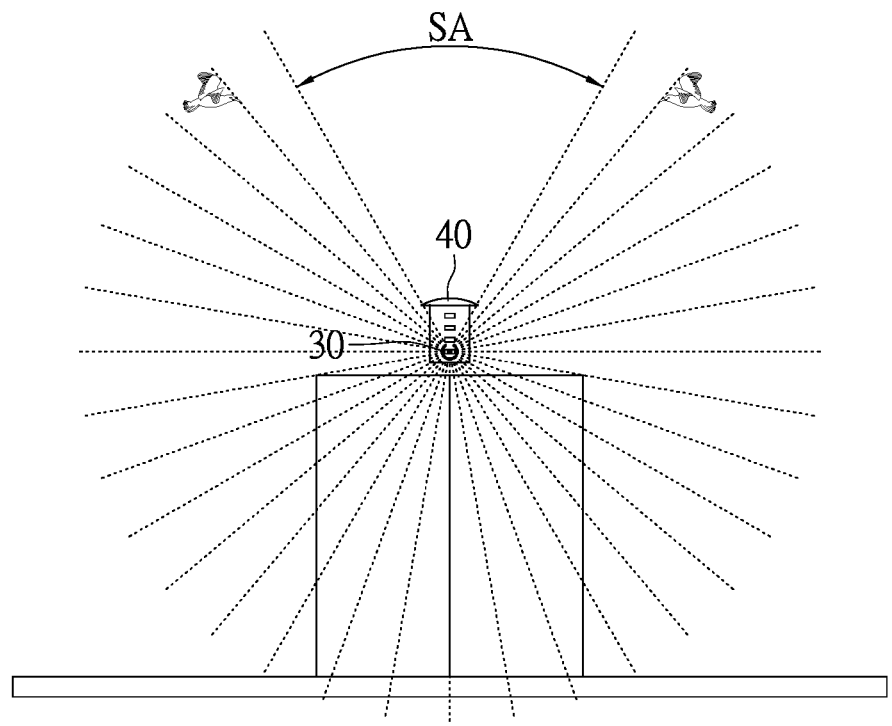
Figure 1E:
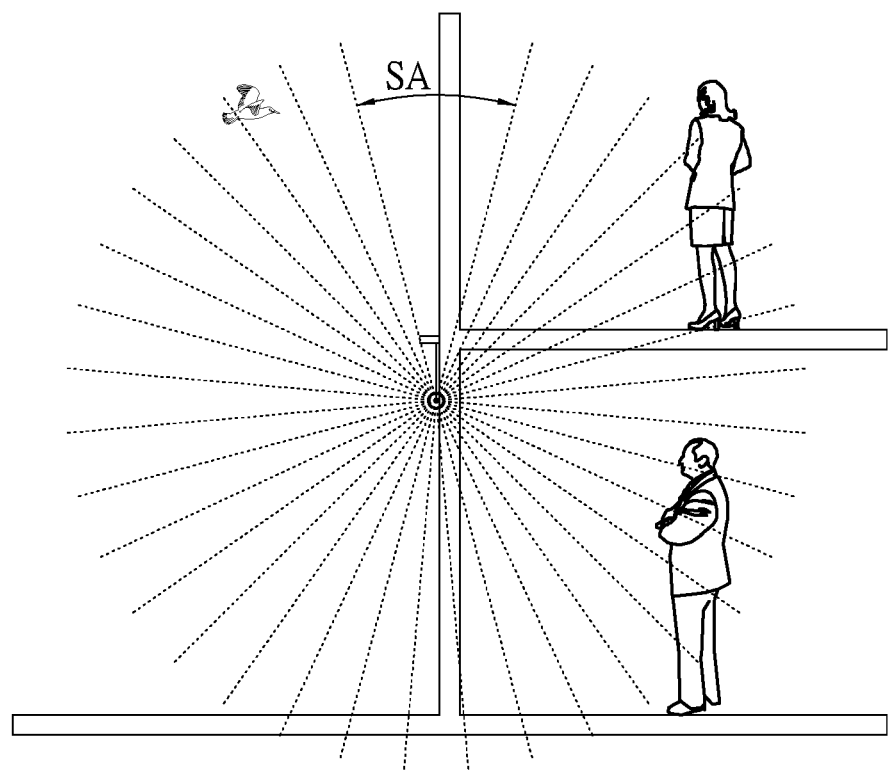

Reference will now be made in detail to the exemplary embodiments of the present disclosure, examples of which are illustrated in the accompanying drawings. Wherever possible, the same reference numbers are used in the drawings and the description to refer to the same or like parts.

Compared with the prior art of U.S. Pat. No. 8,169,356 B2 the present invention has three merits; First, it innovatively introduces a metallic cup as a microwave confining unit to manage the detection zone of the microwave signal unlike the prior art using a reflector positioned high above the microwave radiating elements 30 for enhancing the downward detection capacity. The microwave radiating elements 30 of the said prior art are far away from the reflector. The said microwave radiating elements 30 are disposed outside the reflector. The present invention instead positions the microwave sensing unit (equal to the radiating elements of U.S. Pat. No. 8,169,356 B2) inside a hollow metallic cup with open bottom so that the microwave signal is downwardly shaped to form a confined detection zone suitable for a predetermined space. Unlike the prior art the present invention does not need to reduce the transmitting power of the microwave motion sensor. The detection zone is more precisely defined to avoid unwanted embarrassment of wrong detection. The scope of the detection zone is determined by the taper angle of the metallic cup or by the diameter of the bottom opening of the metallic cup.

Second, the present invention further introduces an adjustable means connected with the microwave sensing unit to adjust the position of the microwave sensing unit up or down inside the metallic cup or an adjustable means connected with the metallic cup to adjust the position of the metallic up or down relative to the microwave sensing unit with an effect to enlarge or contract the scope of the detection zone. Third, the present invention further introduces a hollow metallic cup composed of several adjustable window gates with each window gate independently adjustable to open outward angle so as to allow extension of microwave detection capacity along the direction of angle(s) opened. This allows the users to manage the microwave detection zone according to the environmental characteristic of their living spaces. FIG. 2~FIG. 15B show how the negative features of the microwave motion sensor are corrected and converted to positive features by applying the technologies of the present invention. More details of the present invention are disclosed in the following paragraphs.

Figure 2:
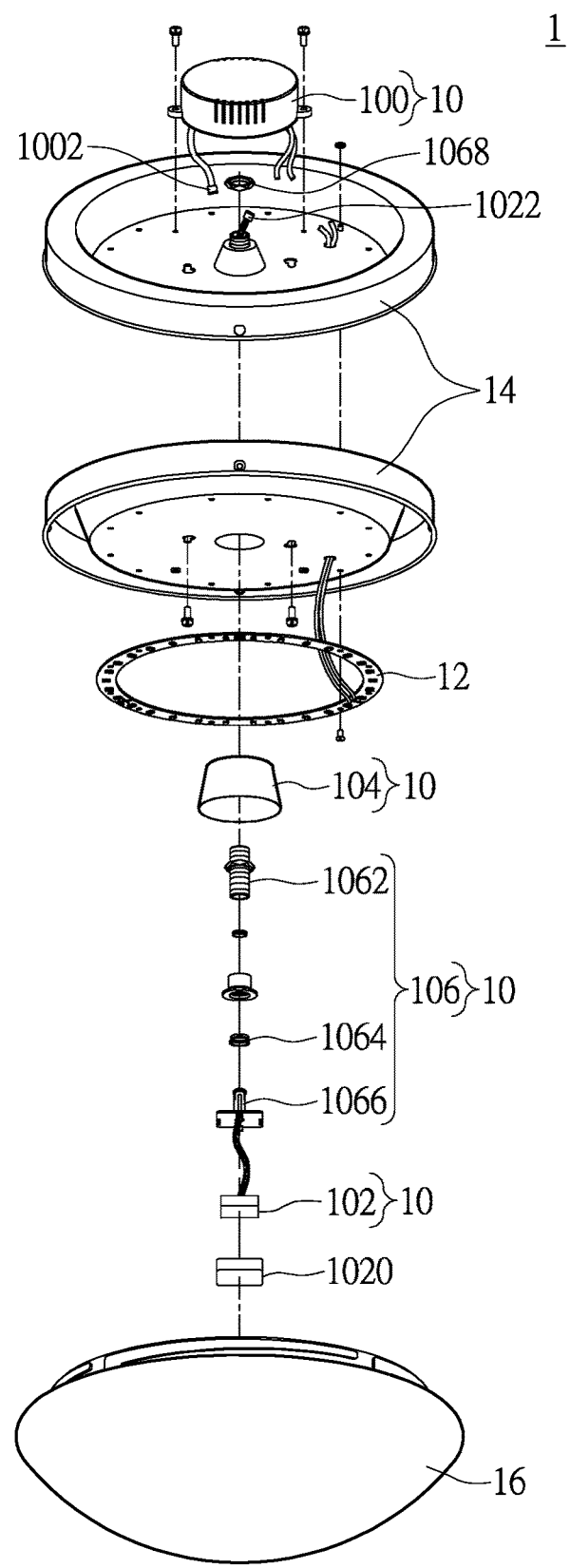
FIG. 2 is a schematic diagram of illumination apparatus with microwave motion sensor according to one embodiment of the present invention.

FIG. 2 is a schematic diagram of illumination apparatus with microwave motion sensor according to one embodiment of the present invention. Please refer to FIG. 2. An illumination apparatus 1 comprises a microwave motion sensor 10, an illumination module 12, a mounting module 14 and a light diffuser 16. Practically, the microwave motion sensor 10 is for motion detection or intrusion detection in a predetermined space. The illumination module 12 is for emitting light. The mounting module 14 is for mounting the illumination apparatus 1 onto the ceiling, wall or equipment. The light diffuser 16 is for diffusing light. Thus, when somebody moves into the predetermined space such as the detection zone of the microwave motion sensor 10, the illumination module 12 will emit light to the predetermined space.

In detail, the microwave motion sensor 10 comprises a control unit 100, a microwave sensing unit 102, a microwave confining unit 104 and an adjustable means 106. The control unit 100 is electrically coupled to the microwave sensing unit 102. The microwave confining unit 104 is such as metallic cup to surround the microwave sensing unit 102. The adjustable means 106 is integrated with the microwave sensing unit 102. Therefore, the microwave sensing unit 102 is movable up and down along an axis in an accommodating space of the microwave sensing unit 102.

The control unit 100 comprises a microcontroller with a hardware setup and software program codes to perform functions of generating a microwave signal, receiving and processing echoed microwave signal received from the microwave sensing unit 102 generated by a motion intrusion and managing the on/off performance of the illumination module 12 responding to the echoed microwave signal received. The type of the control unit 100 in the present embodiment is not limited thereby.

The microwave sensing unit 102, for transmitting and receiving the microwave signal, is coupled to the control unit 100. Traditionally the microwave sensing unit is such as a microwave antenna being a portion of an unitary control unit. Thus, when the prior art microwave motion sensor detects a motion of somebody in next room, the prior art illumination module will be unwantedly turned on to cause embarrassment and energy waste.

In the present invention, the microwave sensing unit 102 which includes a microwave transmitter and a microwave receiver is structurally separated from the control unit 100 while electrically remaining coupled with the control unit 100 to respectively perform transmitting of microwave signal and receiving of echoed microwave signal.

Further, the microwave confining unit 104 is designed for confining the scope of the detection zone of the microwave signal. The microwave confining unit 104 has an accommodating space formed inside the microwave confining unit 104 with the microwave sensing unit 102 disposed inside the accommodating space. The microwave confining unit 104 is a metallic construction, or a non-metallic construction laminated with metallic foil 1052. For the convenience of explanation, the microwave confining unit 104 in the present embodiment is a metallic cup. For example, the microwave confining unit 104 is a hollow cone shaped body, a hollow cylindrical shaped body or a hollow polygonal shaped body designed to surround the microwave sensing unit 102. The shape of the microwave confining unit 104 in the present embodiment is not limited thereby.

In the other embodiment, the microwave confining unit 104 has a plurality of metallic reflectors surrounding the accommodating space. Any of the metallic reflectors can be individually or collectively pushed outward to create angled gap(s) to allow the microwave signal to pass through for extension of microwave detection. The angle of gap opening determines how far the microwave signal can extend along the direction of gap opening. By adjusting the gap opening angle(s) of the metallic reflectors singularly or plurally, the users are able to manage the shape of microwave detection zone according to the environmental characteristics of their living spaces to avoid unnecessary detection of unwanted area. The type of the microwave confining unit 104 in the present embodiment is not limited thereby.

References are made to FIG. 2, wherein an adjustable means is integrated with the microwave sensing unit 102 to adjust position of the microwave sensing unit 102 inside the accommodating space. For example, the adjustable means is a telescopic unit 106, and the telescopic unit 106 is connected between the control unit 100 and the microwave sensing unit 102. The adjustable telescopic unit 106 is for moving the microwave sensing unit 102 vertically up and down in the accommodating space. The telescopic unit 106 is a piston shaped device comprising a sliding pipe 1066 integrated with a plastic housing 1020 to hold the microwave sensing unit 102 and a nipple construction 1062 with a rubber ring 1064 built into its bottom end. The type of the adjustable means in the present embodiment is not limited thereby.

When the microwave sensing unit 102 is moved upward to a position close to the mounting module 14, the microwave confining unit 104 shades most of the microwave signal heading toward the horizontal direction resulting to a smaller detection zone of the microwave signal. When the microwave sensing unit 102 is moved downward to a position close to the light diffuser 16, the microwave confining unit 104 shades least of the microwave signal heading toward the horizontal direction resulting to a bigger detection zone of the microwave signal. In the other words, the user according to the predetermined space could adjust position of the microwave sensing unit 102 inside the accommodating space to manage the scope of detection zone within an useful range to satisfy different dimension of living space.

In more detail, the microwave confining unit 104 is attached and fastened to the mounting module 14, for instance ceiling pan, through the nipple construction 1062 by screwing a pair of lock nut 1068, from top and bottom surface of the mounting module 14. The microwave sensing unit 102 installed inside the plastic housing 1020 has its connecting cables passing through the sliding pipe 1066 to connect to the control unit 100 located on the upper left surface of the mounting module 14 via connectors 1002 and 1022. The microwave sensing unit 102 with its plastic housing 1020 is positioned inside the microwave confining unit 104 and is further connected to the sliding pipe 1066 of the adjustable means to move up or down for adjusting the vertical position of the microwave sensing unit 1020 along the central axis of the microwave confining unit 104.

The nipple construction 1062 of the adjustable means serves as a female device while the sliding pipe 1066 serves as a male device to slide along the central axis of the nipple construction 1062. The diameter of the sliding pipe 1066 is slightly larger than the inner diameter of the rubber ring 1064 such that the rubber ring 1064 effectively creates a tunnel of rubber wall. The tunnel of rubber wall allows the male arm of sliding pipe 1066 to slide up by an easy hand push or slide down by an easy hand pull inside the hollow space of nipple construction 1062. The rubber ring 1064 is able to grab and hold the sliding pipe 1066 and the connected microwave sensing unit 102 to park at any position inside the microwave confining unit 104 when the sliding motion ceases.

The piston shaped sliding pipe 1066 is designed to perform three functions. The first function is to hold the microwave sensing unit 102, the second function is to serve as a cable pipe for channeling the connecting cables of the microwave sensing unit 102 to connect to the control unit 100, and the third function is to serve as a male device to perform sliding function inside the nipple construction 1062.

The nipple construction 1062 is designed to perform two functions. The first function is to serve as a connector working with lock nuts 1068 and 1070 to fasten the microwave confining unit 104 and mounting module 14 together. The second function is to serve as female device to accommodate the male device of the piston shaped sliding pipe 1066 to perform sliding motion inside its hollow space.

The embodiment of using the position adjustment of the microwave sensing unit 102 inside the metallic microwave confining unit 104 to manage the scope of the detection zone of the microwave signals represents the second innovation of the present disclosure. The relative position of the microwave sensing unit 102 versus the metallic microwave confining unit 104 determines the scope of the microwave detection zone within a range.

It is noted that the illumination module 12 is coupled to the control unit 100. The illumination module 12 is such as a plurality of LEDs or LED module. The mounting module 14 is such as a ceiling pan as shown as FIG. 2. The microwave confining unit 104 is further attached to the ceiling pan. Then, the microwave sensing unit 102 is positioned inside of the metallic cup of the microwave confining unit 104. Thus, the scope of the detection zone of the microwave signal varies based on position of the microwave sensing unit 102 in the accommodating space.

Figure 3:
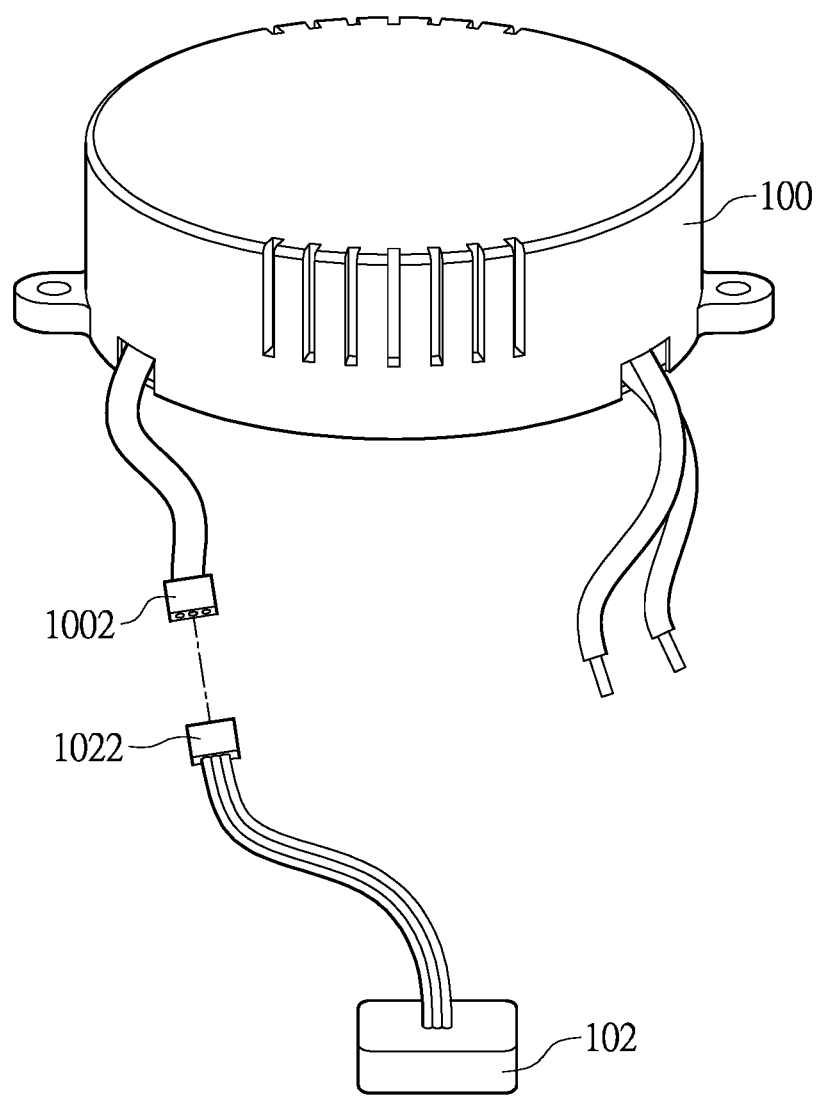
FIG. 3 is a schematic diagram of the control unit and the microwave sensing unit of microwave motion sensor.

In addition, the scope of the detection zone of the microwave signal varies based on the shape of the microwave confining unit 104 and the shape of the microwave confining unit 104 varies based on the predetermined space. When the microwave sensing unit 102 detects motion or intrusion, the control unit 100 controls the illumination module 12 to turn on FIG. 3 is a schematic diagram of the control unit and the microwave sensing unit of microwave motion sensor. Please refer to FIG. 3. The control unit 100 further comprises a first connector 1002 and a first cable. The microwave sensing unit 102 further comprises a second connector 1022 and a second cable. The first connector 1002 and the second connector 1022 are a female connector and a male connector respectively. In the other words, the first connector 1002 and the second connector 1022 are a pair of connectors.

In detail, the circuit assembly is divided into the control unit 100 and the microwave sensing unit 102. The microwave sensing unit 102 is structurally separated from the whole circuit assembly of the microwave motion sensor 10 while electrically remaining coupled to the control unit 100 through cables and connectors 1002 and 1022. With such arrangement, the microwave sensing unit 102 can be removed and placed inside the microwave confining unit 104. The implementation of the control unit 100 and the microwave sensing unit 102 is not limited in the present embodiment, and the one skilled in the art may freely design it according to the actual needs.

Figure 4A:
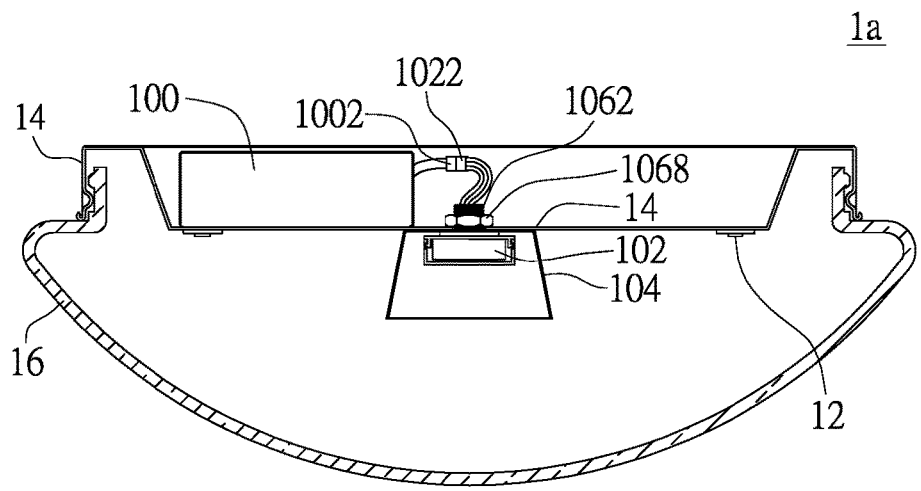
FIG. 4A is a schematic diagram of illumination apparatus with microwave motion sensor according to another embodiment of the present invention.
Figure 4B:
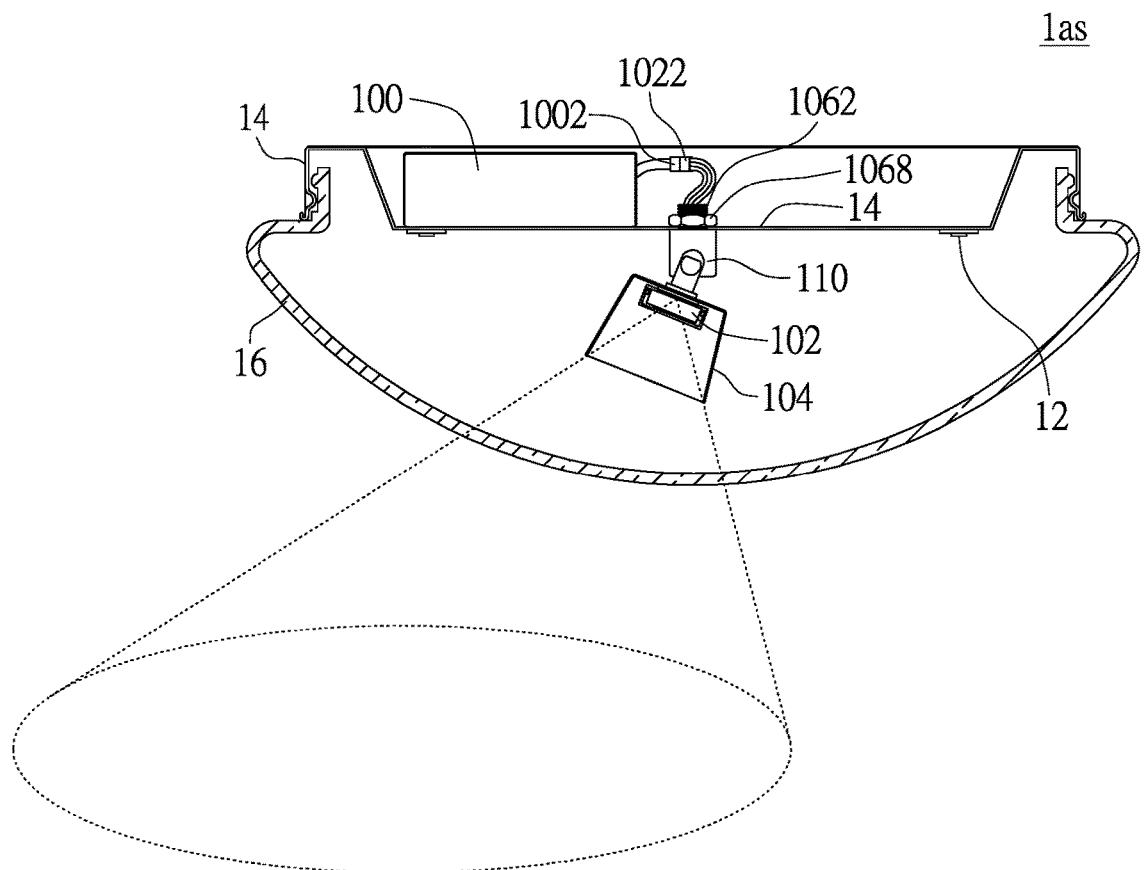
FIG. 4B is a schematic diagram of illumination apparatus with a microwave motion sensor according to another embodiment of the present invention, wherein a swivel connector is installed for adjustment of detection angle.

FIG. 4A and FIG. 4B are schematic diagrams of illumination apparatus with microwave motion sensor according to another embodiment of the present invention, respectively. Please refer to FIG. 4A. The illumination apparatus 1a comprises the control unit 100, the microwave sensing unit 102 and the microwave confining unit 104. Both the microwave sensing unit 102 and the microwave confining unit 104 are fixed to the mounting module 14. The embodiment of FIG. 4A is a simple and lower cost solution to be applied to devices wherein the installation of an adjustable means is either impossible or not necessary, for instance, a LED light bulb with a built-in microwave motion sensor, or a fixed detection zone for antitheft security alarm system. The type of the illumination apparatus 1a in the present embodiment is not limited thereby.

The embodiment of FIG. 4B is another embodiment of the present invention, wherein the illumination apparatus 1 as further comprises swivel connector 110. The swivel connector 110 is installed for adjustment of detection angle. For example, the user adjusts a rotated position of the microwave confining unit 104 based on the swivel connector 110. Thus, the scope of detection zone is positioned according to the rotated position.

Figure 5A:
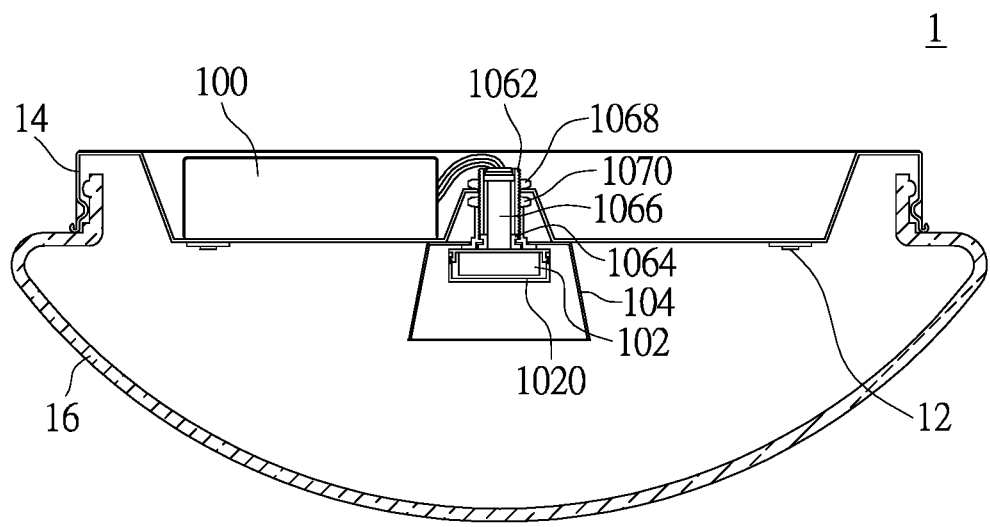
FIG. 5A is a schematic diagram of illumination apparatus with microwave motion sensor according to another embodiment of the present invention.
Figure 5B:
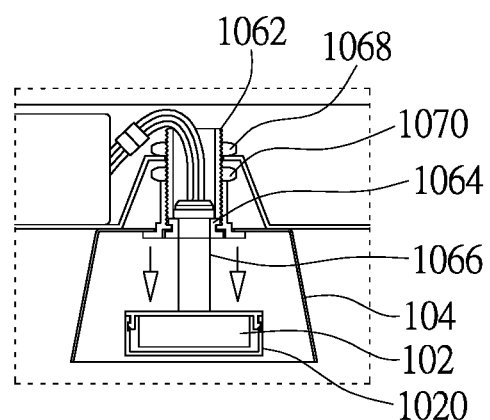
FIG. 5B is another schematic diagram of microwave motion sensor according to the embodiment of FIG. 5A.

FIG. 5A is a schematic diagram of illumination apparatus with microwave motion sensor according to another embodiment of the present invention. FIG. 5B is another schematic diagram of microwave motion sensor according to the embodiment of FIG. 5A. Please refer to FIGS. 5A and 5B.

As shown in FIG. 5A, if the microwave sensing unit 102 is positioned deeply inside the metallic microwave confining unit 104. The scope of the detection zone of the microwave signals is minimal as the microwave signals are mostly shaded by the metallic wall of the microwave confining unit 104. On the other hand, if the microwave sensing unit 1020 is positioned close to the open bottom of the microwave confining unit 104 as shown in FIG. 5B. The scope of the detection zone of the microwave signals will be maximal as only the top portion of the microwave signals is shaded by the metallic microwave confining unit 104 above the microwave antenna sensing.

This is an important and useful feature of the present disclosure since it provides the end users with a capacity to flexibly adjust the scope of detection zone of the microwave signals according to the predetermined space, for instance the size of their living space. The current exemplary of the adjustable means is only one of the many ways with the adjustable concept of the present disclosure.

Aside from the use of adjusting the relative position between the microwave confining unit 104 and the microwave sensing unit 1020 through the adjustable means to manage the effective radius of the microwave detection zone the present art also discloses a few new techniques to expand the microwave detection capacity in desired directions according to the predetermined space requirements of the users.

Figure 5C:
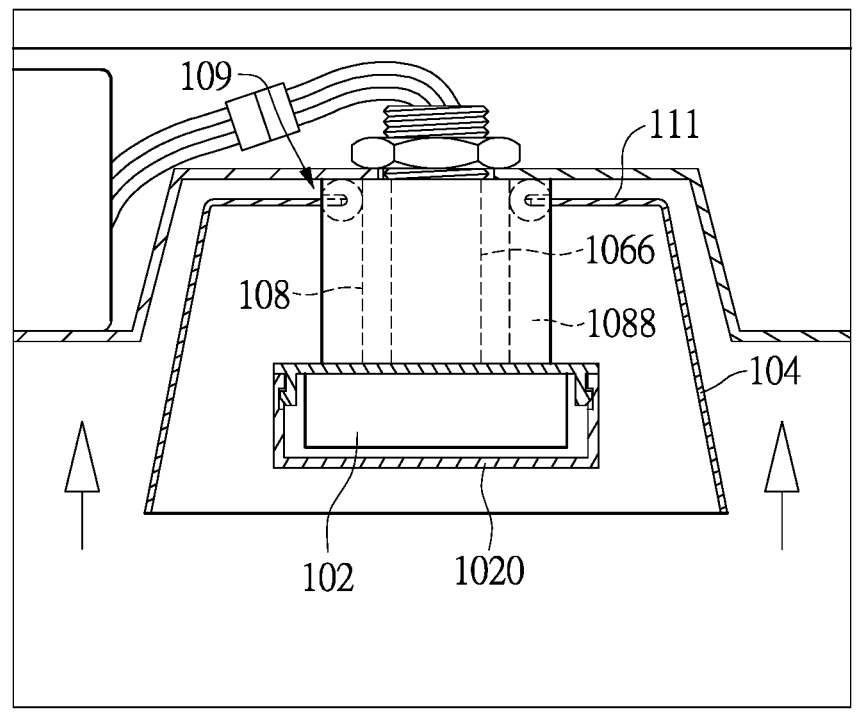
FIG. 5C is a schematic diagram of microwave motion sensor according to another embodiment of the present invention.
Figure 5D:
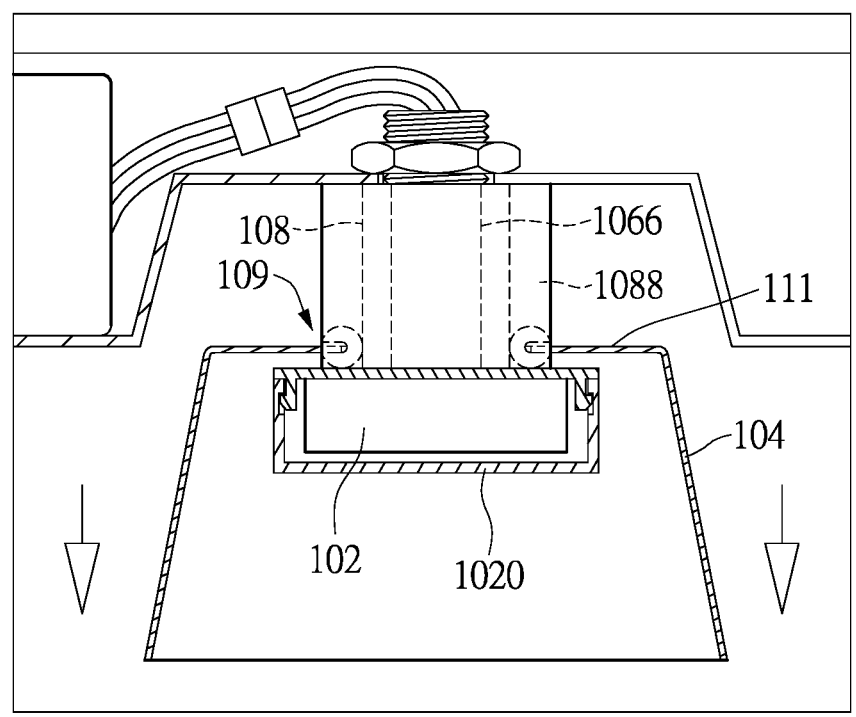
FIG. 5D is another schematic diagram of microwave motion sensor according to the embodiment of FIG. 5C.

FIG. 5C is a schematic diagram of microwave motion sensor according to another embodiment of the present invention. FIG. 5D is another schematic diagram of microwave motion sensor according to the embodiment of FIG. 5C. Please refer to FIGS. 5C and 5D. The difference between FIG. 5C and FIG. 5A is that the microwave confining unit 104 is movable up and down within a range while the microwave sensing unit 102 is fixed to the mounting module, the ceiling or the wall.

The sliding pipe 1066 has a fixed length so that the microwave sensing unit 102 is positioned in the same place. The microwave confining unit 104 has a neck portion 111 and a slot 109. The slot 109 is disposed on the neck portion 111. The front section of the sliding pipe 1066 is surrounded with a rubber column 108. The rubber column 108 has rubber mono track 1088. When the relative motion between the rubber mono track 1088 and the slot 109 occurs, the microwave confining unit 104 moves up or down. When the microwave confining unit 104 is moved downward the ground, the scope of the detection zone will be minimal as shown as FIG. 5D. When the microwave confining unit 104 is moved upward the mounting module, the scope of the detection zone will be maximal as shown as FIG. 5C. The type of the microwave motion sensor in the present embodiment is not limited thereby.

Figure 6A:
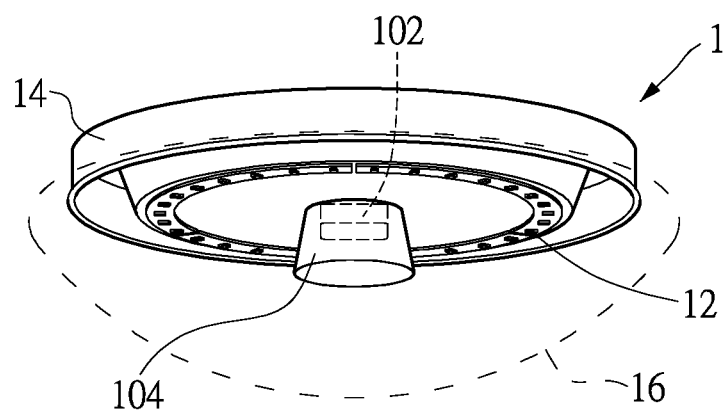
FIG. 6A is a schematic diagram of illumination apparatus with microwave motion sensor for smaller detection zone.
Figure 6B:
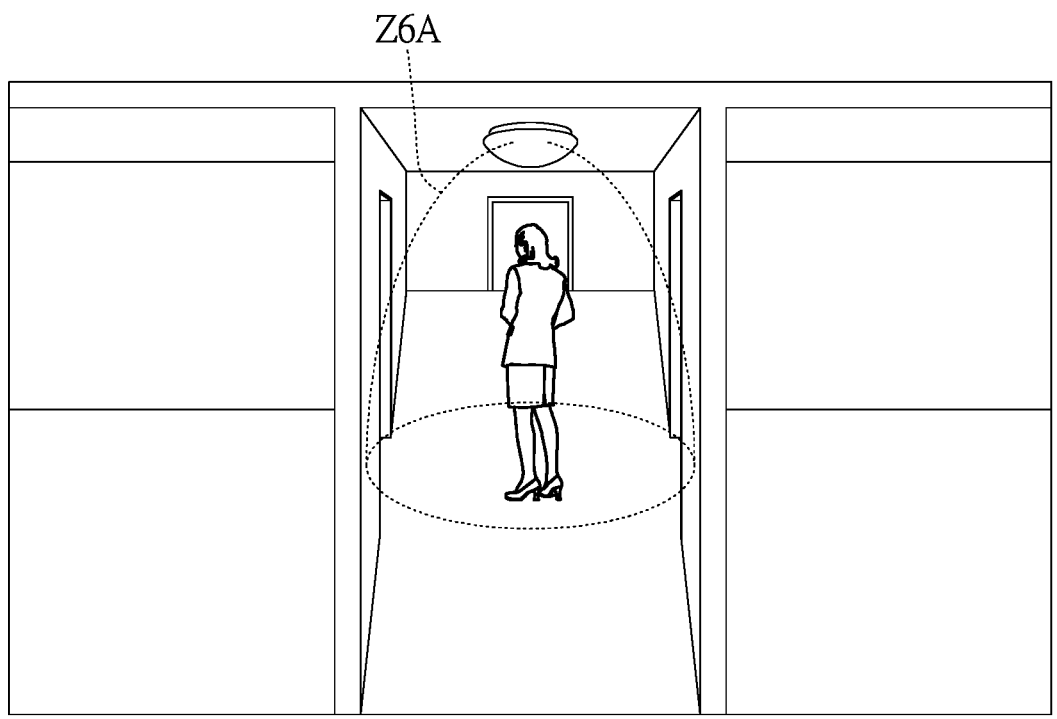
FIG. 6B according to the embodiment of FIG. 6A is an operating diagram of illumination apparatus with a microwave motion sensor for a smaller detection zone.

FIG. 6A is a schematic diagram of illumination apparatus with microwave motion sensor for smaller detection zone. FIG. 6B according to the embodiment of FIG. 6A is an operating diagram of illumination apparatus with microwave motion sensor for smaller detection zone. Please refer to FIGS. 6A and 6B. When the microwave sensing unit 102 closes to the mounting module 14, for instance the microwave sensing unit 102 is located at top side of the microwave confining unit 104. The microwave confining unit 104 shades most of the microwave signal heading toward the horizontal direction, so as to downward shaping the smaller detection zone Z6A of the microwave signal. As shown as FIG. 6B.

Figure 6C:
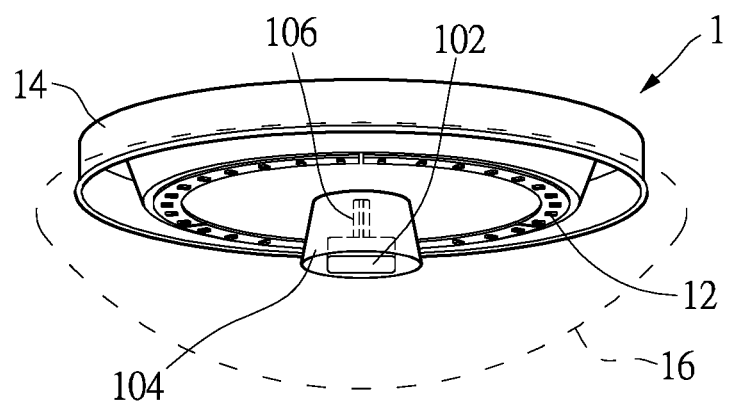
FIG. 6C is a schematic diagram of illumination apparatus with microwave motion sensor adjusted for a bigger detection zone.
Figure 6D:
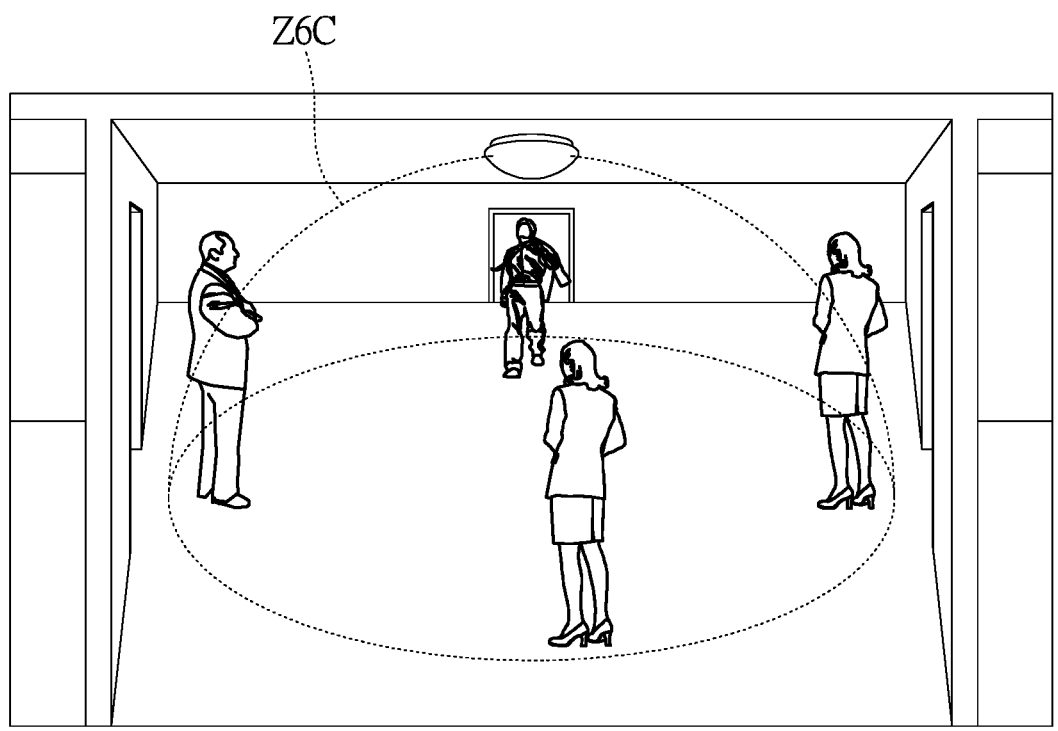
FIG. 6D is an operating diagram of illumination apparatus with microwave motion sensor adjusted for a bigger detection zone.

FIG. 6C is a schematic diagram of illumination apparatus with microwave motion sensor for bigger detection zone. FIG. 6D is an operating diagram of illumination apparatus with microwave motion sensor for bigger detection zone. Please refer to FIGS. 6C and 6D. When the microwave sensing unit 102 closes to the light diffuser 16, for instance the microwave sensing unit 102 is located at the opening side of the microwave confining unit 104. The microwave confining unit 104 shades few of the microwave signal heading toward the horizontal direction, so as to downward shaping the bigger detection zone Z6C of the microwave signal.

In the other words, when the predetermined space is a smaller room, the user according to the predetermined space could adjust position of the microwave sensing unit 102 to the top side of the microwave confining unit 104. Thus, the scope of the detection zone Z6A will be small range. When the predetermined space is a bigger room, the user according to the predetermined space could adjust position of the microwave sensing unit 102 to the opening side of the microwave confining unit 104. Thus, the scope of the detection zone Z6C will be big range. On the basis of the above, the scope of the detection zone Z6A and Z6C of the microwave signal could match the predetermined space based on the position of microwave motion sensor 10 in the accommodating space.

Figure 7A:
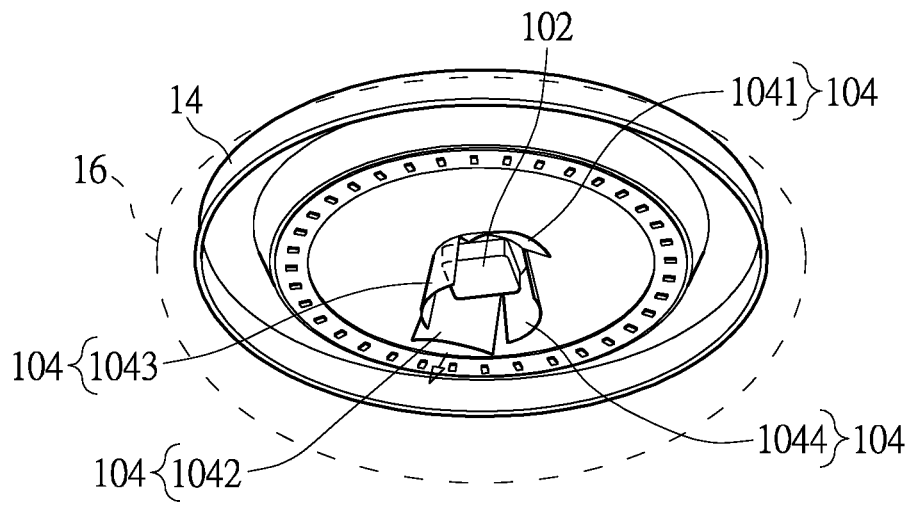
FIG. 7A is a schematic diagram of illumination apparatus with microwave motion sensor operated with two opposite reflectors opened for a hallway application as detection zone according to another embodiment of the present invention.
Figure 7B:
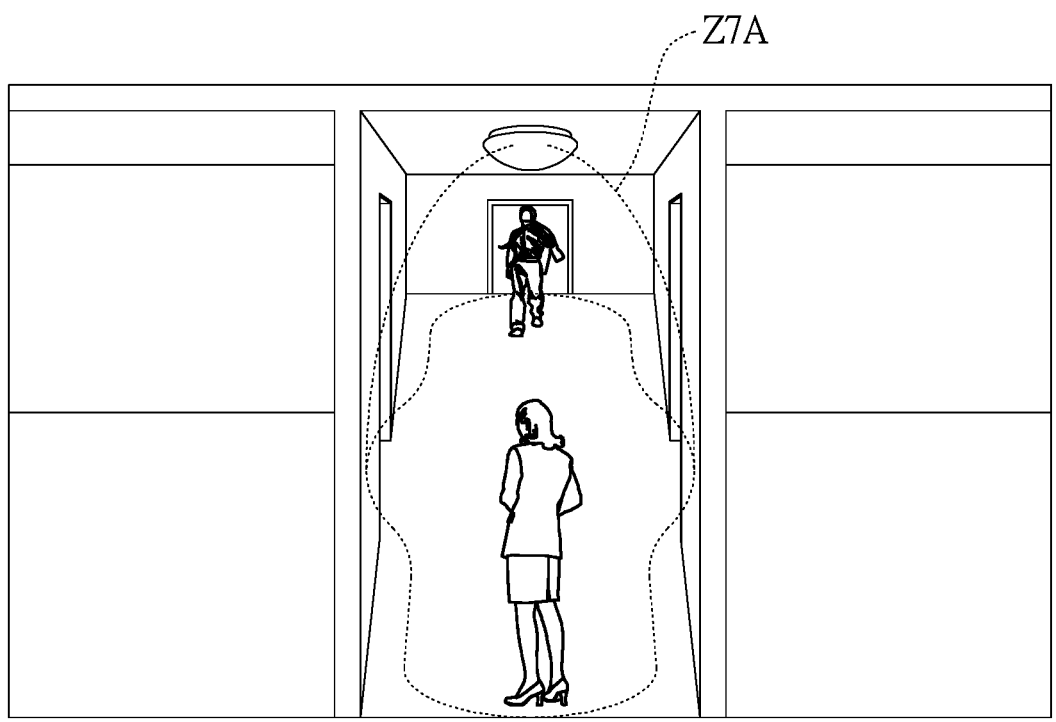
FIG. 7B according to the embodiment of FIG. 7A is an operating diagram of illumination apparatus with microwave motion sensor operated with two opposite reflectors opened for a hallway application as detection zone.

FIG. 7A is a schematic diagram of illumination apparatus with microwave motion sensor for hallway as detection zone according to another embodiment of the present invention. FIG. 7B according to the embodiment of FIG. 7A is an operating diagram of illumination apparatus with microwave motion sensor for hallway as detection zone. Please refer to FIGS. 7A and 7B.

For explanation convenience, the microwave confining unit 104 has four metallic reflectors 1041, 1042, 1043 and 1044 and the metallic reflectors 1041, 1042, 1043 and 1044 form a metallic shade for reflecting the microwave signal. In more detail, two opposite metallic reflectors 1041 and 1042 are pulled outward in two opposite directions to allow the microwave signals to extend its detection capacity along the motion path in a hallway application.

Figure 7C:
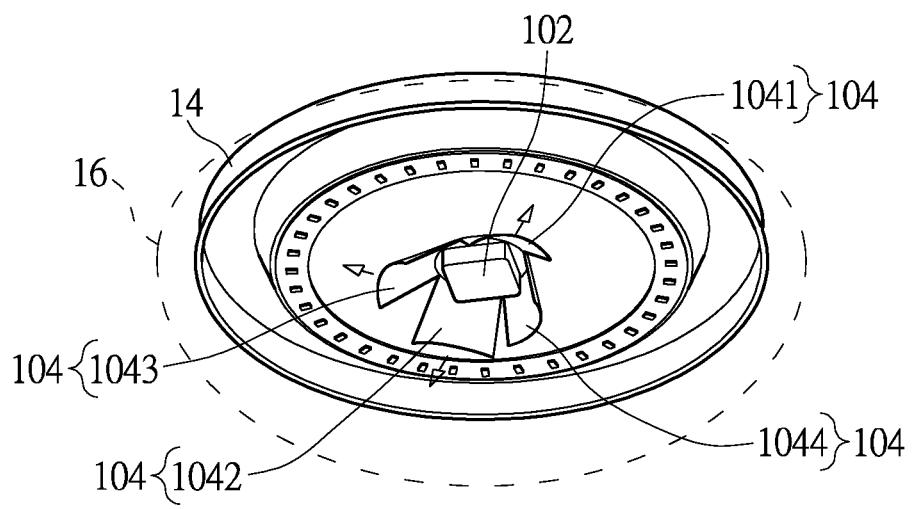
FIG. 7C is a schematic diagram of illumination apparatus with microwave motion sensor operated with three reflectors opened for outdoor application as detection zone according to another embodiment of the present invention.
Figure 7D:
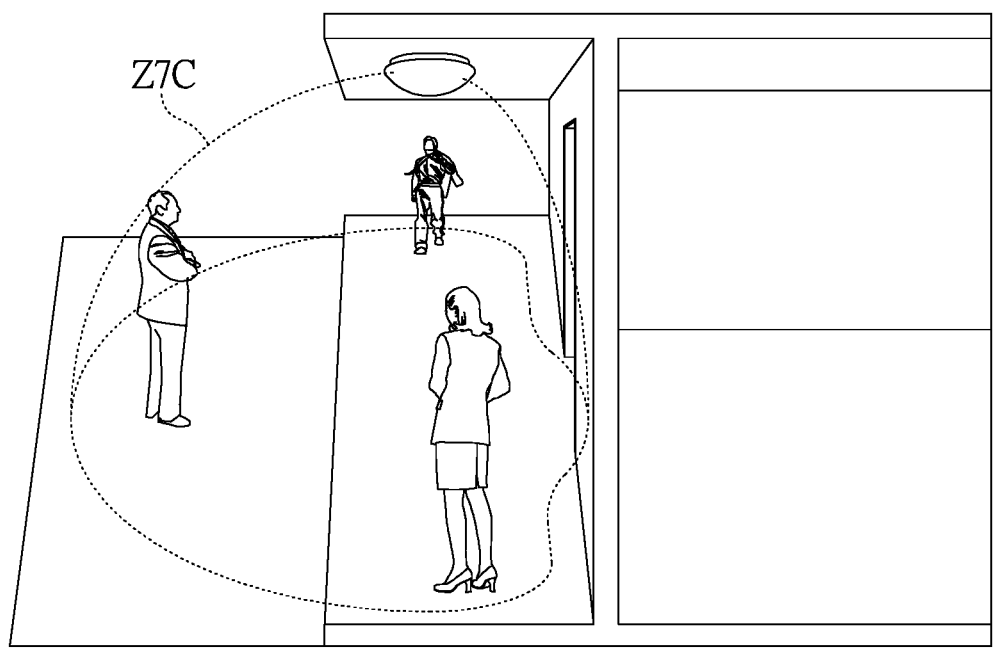
FIG. 7D according to the embodiment of FIG. 7C is an operating diagram of illumination apparatus with microwave motion sensor with three reflector opened for outdoor application as detection zone.

FIG. 7C is a schematic diagram of illumination apparatus with microwave motion sensor for outdoor as detection zone according to another embodiment of the present invention. FIG. 7D according to the embodiment of FIG. 7C is an operating diagram of illumination apparatus with microwave motion sensor for outdoor as detection zone. Please refer to FIGS. 7C and 7D.

The difference of microwave confining unit 104 between FIG. 7A and FIG. 7C is the metallic reflectors 1041, 1042, 1043 and 1044 forming different metallic shade for reflecting the microwave signal. In more detail, two opposite metallic reflectors 1041 and 1042 are pulled outward in two opposite directions to allow the microwave signals to extend its detection capacity along the motion path in an outdoor application. One metallic reflector 1043 closing the outdoor are pulled outward the direction of outdoor. One metallic reflector 1044 closing the indoor are not pulled. As shown as FIG. 7C.

The scope of the detection zone Z7A of the microwave signal is a long strip range in FIG. 7B. The scope of the detection zone Z7C of the microwave signal is a hemispherical range in FIG. 7D. For example, in FIG. 7D somebody does not go into the detection zone Z7C, for instance somebody walking indoor near to the outdoor entry, the illumination apparatus 1 does not emit light. When somebody walks pass the outdoor entry, the illumination apparatus 1 emits light. It is convenience for improving efficiency and saving energy.

Figure 8A:
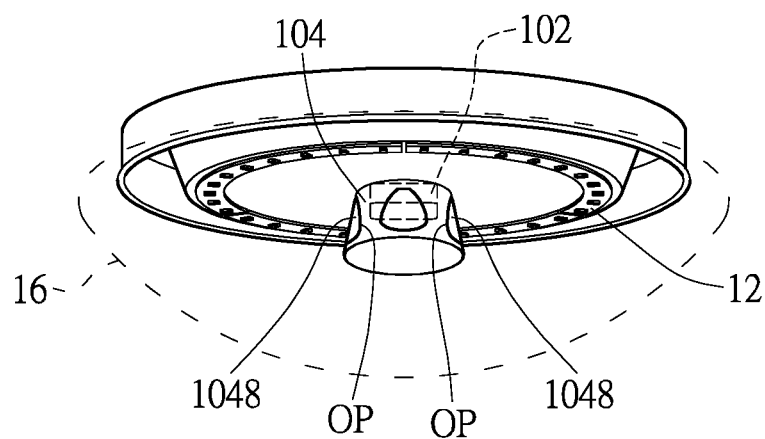
FIG. 8A is a schematic diagram of illumination apparatus with microwave motion sensor operated with no window gate/reflector opened.
Figure 8B:
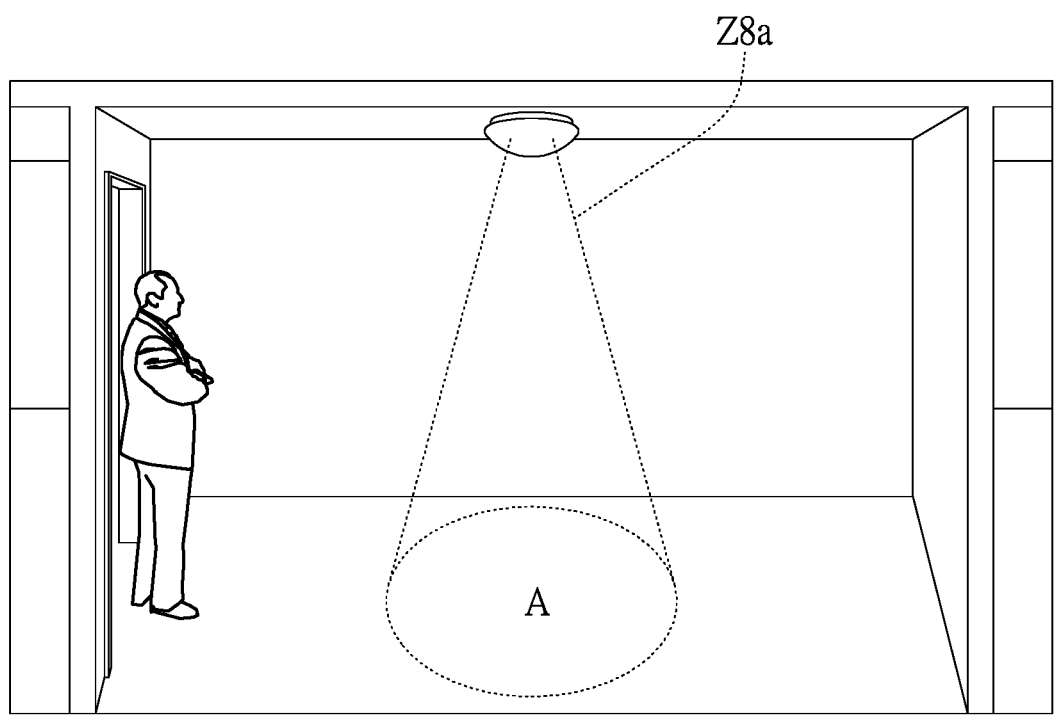
FIG. 8B according to the embodiment of FIG. 8A is an operating diagram of illumination apparatus operating in a local detection zone.

FIG. 8A is a schematic diagram of illumination apparatus with microwave motion sensor operated with no window gate/reflector opened. FIG. 8B is an operating diagram of illumination apparatus operating in a local detection zone A. When the microwave confining unit 104 is operated without any of the pre-punched window gate 1048 opened, the microwave sensing unit 102 operates its detection capacity in a local detection zone A. The local detection zone A is for detecting a local motion.

Figure 8C:
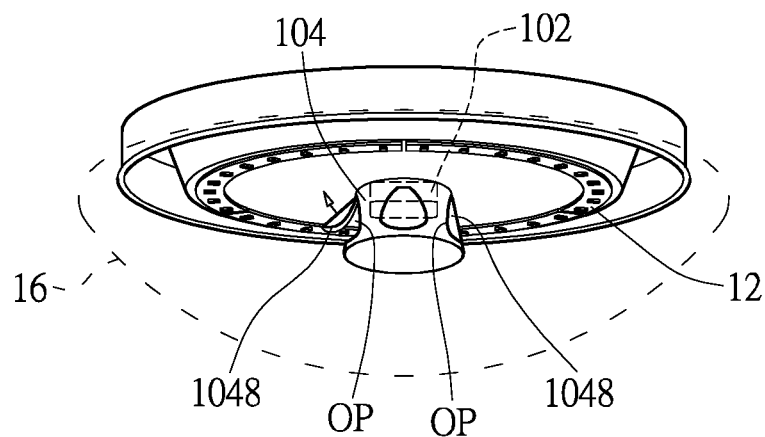
FIG. 8C is a schematic diagram of illumination apparatus with microwave motion sensor operated with one window gate opened.
Figure 8D:
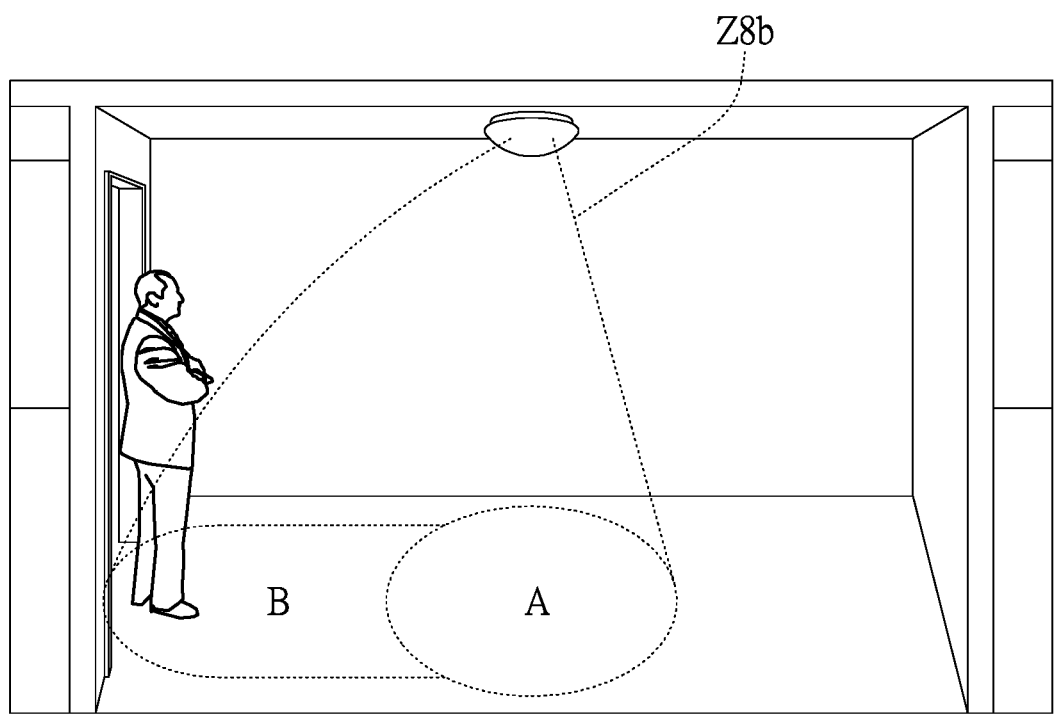
FIG. 8D according to the embodiment of FIG. 8C is an operating diagram of illumination apparatus operating in a composite detection zone.

FIG. 8C is a schematic diagram of illumination apparatus with microwave motion sensor operated with one window gate opened. FIG. 8D is an operating diagram of illumination apparatus operating in a composite detection zone B. When the microwave confining unit 104 is operated with at least one pre-punched window gate 1048 opened, the microwave sensing unit 102 operates its detection capacity in a composite detection zone B composed of the local detection zone A and an extended destination detection zone created by the pre-punched window gate 1048 opened leading to an entry.

The extended destination detection zone is for detecting a destination motion, which is either an incoming motion or an outgoing motion, and the local detection zone A is for detecting a local motion. The destination motion is featured with a long duration of motion signal while the local motion inside the local detection zone A is featured with a short duration of motion signal.

The recognition of a destination motion (either incoming motion or outgoing motion) is based on the time length of the motion signal being equal to or longer than a preset reference time length, wherein the preset reference time length is designed to differentiate between destination motions and local motions occurred in the predetermined space. The preset reference time length representing the minimum time length required for walking through the composite detection zone B can be established as a reference for differentiation between the destination motion and the local motion.

In addition, a reflective incoming motion signal is featured with a frequency pattern received higher than a frequency pattern transmitted, while a reflective outgoing motion signal is featured with the frequency pattern received lower than the frequency pattern transmitted.

An occupancy detection software is designed in the control unit to record and update the occupancy status of the predetermined space. A numerical value counter of the occupancy detection software is established to operate the calculation of the occupancy status by counting the occurrences of each incoming motion and each outgoing motion in the predetermined space.

For example, whenever the predetermined space is unoccupied, the numerical value is set at zero and the light is consequently in turned off state. Whenever an incoming motion is detected, the numerical value of the occupancy counter is added 1. When an outgoing motion is detected, the numerical value of the occupancy counter is deducted 1.

Whenever the numerical value of the occupancy counter is changed from zero to a positive integer, the microcontroller accordingly manages to turn on the light. Whenever the numerical value of the occupancy counter is changed from a positive integer to zero, the microcontroller accordingly manages to turn off the light. The numerical value of the occupancy counter represents the number of persons remaining in the predetermined space whenever the numerical value of the occupancy counter becomes zero meaning no one in the predetermined space.

The reference time length is established by a search subroutine on an automatic basis. Whenever the power is on, the microcontroller checks its memory status to see if a reference time length is preset in the predetermined space. In the absence of an established reference time length, the microcontroller accordingly operates an automatic search subroutine to identify an adequate reference time length to be used for differentiation between destination motions and local motions. When the light is turned on, the microcontroller operates a program code to search a lower frequency motion signal with the longest time length by comparing the time lengths of different lower frequency motion signals detected. If the last selected motion signal with the longest signal time length successfully survives a predetermined delay time with no further motion signals detected, the time length of the last selected motion signal is then concluded as an adequate reference time length.

The automatic search subroutine is designed to measure the actual time length required for a user to walk through the composite detection zone B toward the entry door and after a preset time delay with no further motion signal being detected, the signal time length of the last motion is thereby concluded as an adequate reference time length. The process continues a few times to collect and form a database of different time lengths representing different walking behaviors or different users, the microcontroller then selects a reference time length which is equal or shorter than the shortest time length in the collected data base as the reference time length for performing occupancy detection. During the search period for building the database, the motion sensor uses a timer mode to turn off the light. After the search process is completed, the motion sensor switches the turn off control from the timer mode to the occupancy mode with the load to be turned off when the numerical value of the occupancy detector becomes zero.

Figure 8E:
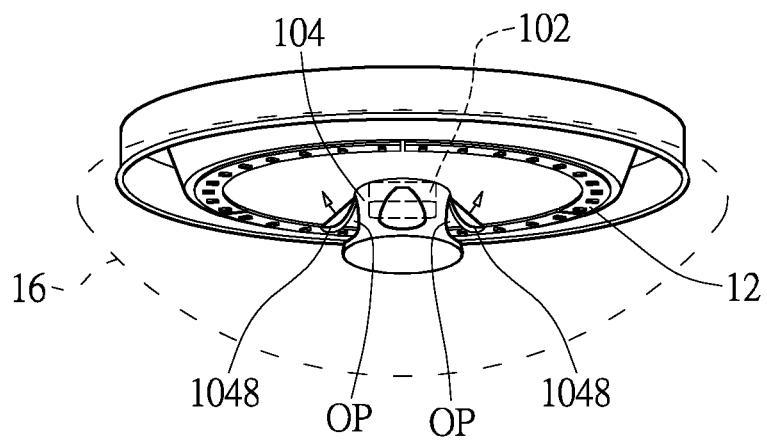
FIG. 8E is a schematic diagram of illumination apparatus with microwave motion sensor operated with two opposite window gates opened for an indoor application as detection zone according to another embodiment of the present invention.
Figure 8F:
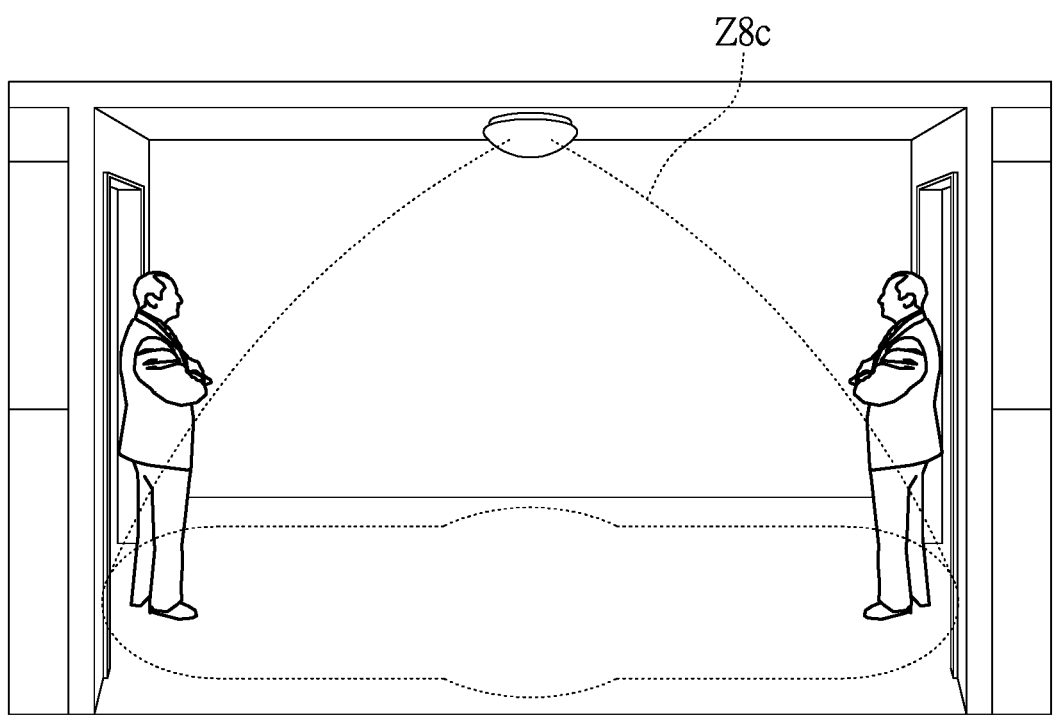
FIG. 8F according to the embodiment of FIG. 8E is an operating diagram of illumination apparatus with microwave motion sensor operated with two opposite window gates/reflectors opened for an indoor application as detection zone.

FIG. 8E is a schematic diagram of illumination apparatus with microwave motion sensor operated with two opposite window gates opened for an indoor application as detection zone according to another embodiment of the present invention. FIG. 8F is an operating diagram of illumination apparatus with microwave motion sensor operated with two opposite window gates/reflectors opened for an indoor application as detection zone. FIG. 8E schematically illustrates a microwave confining unit 104, such as a hollow cylindrical body composed of four metallic pre-punched window gates 1048. Each of the metallic pre-punched window gates 1048 faces different direction. Each of the metallic pre-punched window gates is such as foldable metallic reflector. In FIG. 8E, some pre-punched window gates 1048 are pulled outward to form two window openings OP to allow the microwave signal to pass through and extend its detection capacity along an opening direction of the window openings OP. This embodiment serves the same functions as the embodiments of FIGS. 7A and 7B.

Figure 8G:
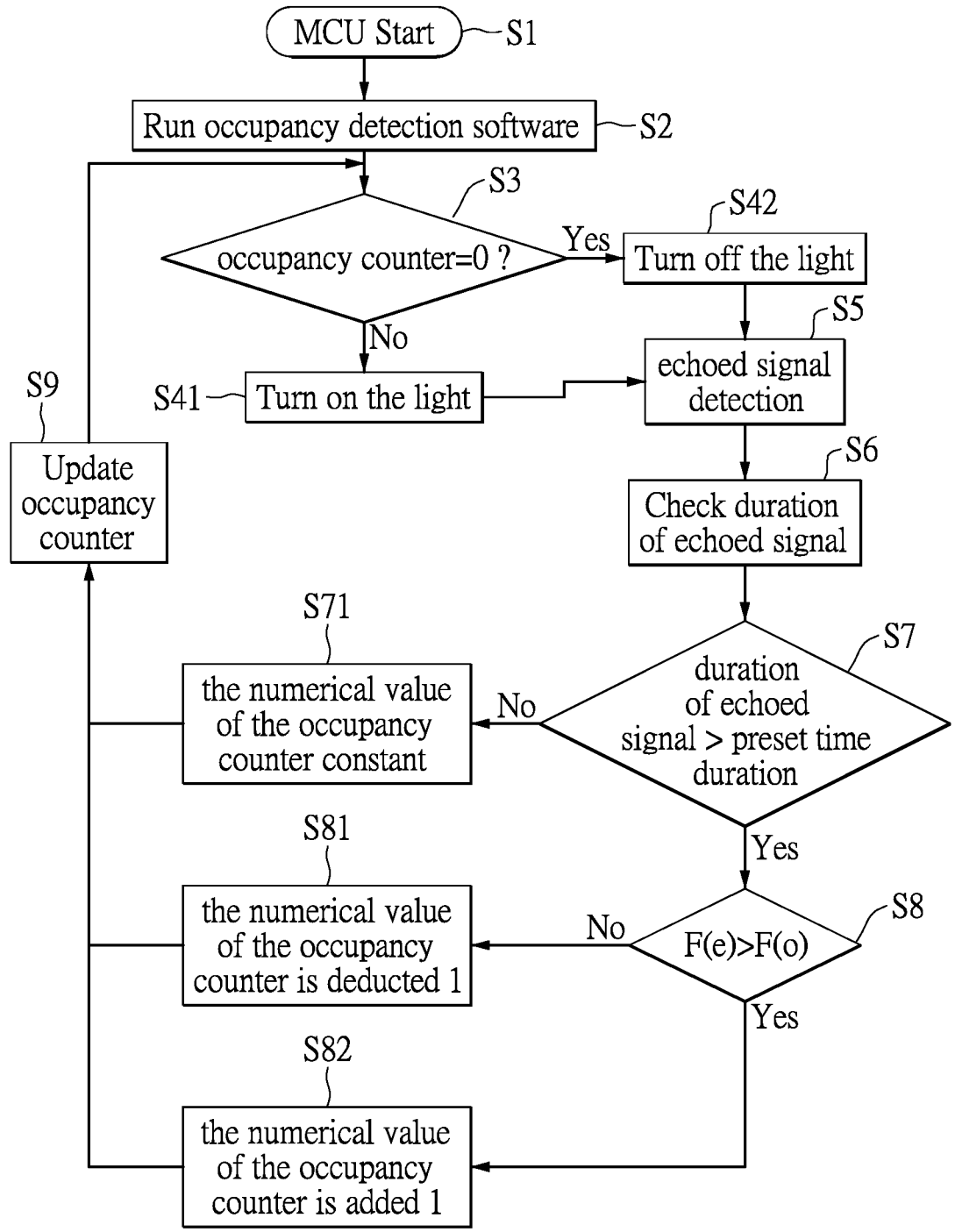
FIG. 8G is a flowchart of a software algorithm showing occupancy counter operation steps by illumination apparatus with a motion sensor (either a microwave motion sensor or an ultrasonic motion sensor) for transmitting wave signal and receiving echoed signal of the wave signal reflected from a moving human body.

FIG. 8G is a flowchart of a software algorithm showing occupancy counter operation steps by illumination apparatus with a motion sensor for transmitting wave signal and receiving echoed signal of the wave signal reflected from a moving human body. The phrase of "motion sensor" herein after shall represents a general terminology of either a microwave motion sensor or an ultrasonic motion sensors and the word of "wave" shall mean either a microwave or an ultrasonic wave. For the microwave motion sensor it is further divided into low frequency microwave motion sensor operated at below 20 GHz which has an obvious wall penetration feature and high frequency microwave motion sensor operated at 24 GHz or higher. For the low frequency microwave motion sensor a microwave confining shade is required to help confining an usable detection zone for operating motion detection. For the high frequency microwave motion sensor, there is no wall penetration issue and therefore no confining device is needed at all. The occupancy software algorithm illustrated below is equally applicable to above described three embodiments of motion sensor.

At step S1 and step S2, the microcontroller (MCU) starts and runs occupancy detection software of the occupancy counter. At step S3, judgment is carried out as to whether or not the numerical value of the occupancy counter is zero. If YES, the microcontroller turns off the illumination apparatus at step S42. If NO, the microcontroller turns on the illumination apparatus at step S41.

At step S5, echoed signals detection, the motion sensor works for detecting motion intrusion. At step S6, Check duration of echoed signal, the microcontroller checks motion intrusion based on duration of echoed signal.

At step S7, judgment is carried out as to whether or not the duration of echoed signal is greater than a preset time duration to pass through entryway. If the judgment result of step S7 is YES, judgment is carried out as to whether or not the frequency pattern of echoed signals F(e) is greater than the frequency of the original signals F(o) at step S8. If the judgment result of step S7 is NO, the numerical value of the occupancy counter is unchanged.

If the judgment result of step S8 is YES, the numerical value of the occupancy counter is added 1 at step S82. If the judgment result of step S8 is No, the numerical value of the occupancy counter is deducted 1 at step S81.

In addition, when an object is approaching the motion sensor, the frequency pattern of echoed signals, F(e), received by the motion sensor will be increasingly higher than the frequency of the original signals F(o) transmitted out, $F(e)>F(o)$. When an object is leaving the motion sensor the frequency pattern of echoed signals received by the motion sensor will be decreasingly lower than the frequency of the original signals F(o) transmitted out, $F(e)<F(0)$.

Such physical phenomenon of Doppler Effect makes it possible to design a software program working with a microcontroller and a motion sensor circuitry to monitor and record the incomings and outgoings of people passing through the entryway of a room or a home space. In other words, the occupancy detector can tell the number of people remaining in a room at any time; when no one in the room and an echoed signal is detected by the motion sensor, the microcontroller will turn on the light. When the numerical value of occupancy detector indicates no one remaining in the room after last echoed signal, the microcontroller recognizes the last person has left the room and thereby turns off the light accordingly.

The motion signals of passing through the entryway can be differentiated from other random motion signals occurred inside the room by means of time length difference of the echoed signals. For the microwave motion sensor operating at a frequency under 20 GHz, the wall penetration effect is very obvious, the technique of using a metallic cup to confine and manage the scope of the detection zone of the microwave motion sensor as disclosed in the present invention can help to accomplish such goal. For the microwave motion sensor operating at a frequency equal to 24 GHz or higher, the wall penetration effect is substantially reduced to a negligible level and the use of a wave confining shade is not necessary. For ultrasonic motion sensor there is no wall penetration issue at all.

An occupancy counting software can be written in the OTP ROM of the microcontroller to count the frequencies of incomings and outgoings. The numerical value of the occupancy counter represents the number of people remaining in the room. The occupancy counter starts with a numerical value of 0 when a room is unoccupied. When the motion sensor detects echoed signal with frequency increasingly higher than the original frequency transmitted outward, $F(e)>F(o)$, the microcontroller acknowledges a person is entering the room, the microcontroller thereby manages to turn on the light and at the same time changes the numerical value of occupancy counter from 0 to 1.

Two conditional events need to be satisfied at the same time in order for the microcontroller to turn on the light; the numerical value of occupancy counter needs to be at zero (first condition) at the time point when a motion signal is detected (second condition). In fact, in order for the microcontroller to turn on the light at time when the numerical value of occupancy is zero, any motion signal can trigger the light to turn on; it does not have to be an incoming signal. When a second person enters the room, the microcontroller adds 1 to the numerical value of occupancy counter to record a new numerical value of two indicating two persons staying in the room and the light continues to stay on.

For each additional person entering the room the microcontroller accordingly adds 1 to the numerical value of occupancy counter and updates the numerical value of occupancy counter to record the total numbers of people staying in the room. When a person leaves the room the motion sensor detects an echoed signal with decreasingly lower frequency than the transmitted frequency, $F(e)<F(o)$ and with a long signal duration of $T>T(0)$, where $T(0)$ is the preset minimum time length required to pass the entryway. The microcontroller acknowledges a person has left the room (Doppler Effect) and accordingly manages to deduct 1 from the numerical value of occupancy counter.

For each additional person leaving the room the microcontroller with program codes manages to deduct 1 from the numerical value of occupancy counter and update the numerical value of occupancy counter accordingly. At a time when a departure signal has been detected and the microcontroller after updating the numerical value of occupancy counter finds the numerical value of occupancy counter becomes zero, which indicates the last person has left and the room is in an unoccupied status, the microcontroller accordingly manages to turn off the light.

When the numerical value of the occupancy counter is at zero (room unoccupied), any motion signal can trigger the microcontroller to turn on the light. The motion signal can be from motion by person moving back and forth inside the room with shorter signal duration or by person moving into the room with longer signal duration. When the numerical value of the occupancy counter is other than zero (room occupied), the microcontroller only processes echoed signals with duration longer than the pre-determined time length $T(0)$ (for instance 3 seconds) which represents the minimum time required to walk through the extended detection zone (Area B) for entering or leaving the room. The signal durations T of random motions inside the non-extended zone (Area A) are always shorter than the pre-determined time length $T(0)$ and the frequency variation is not consistent. Such random motion signals with duration T shorter than the pre-determined time length $T(0)$ therefore are ignored by the microcontroller.

The concept and technique of occupancy detection method can be enhanced to a home automation system where more exit doors are built in a house; in such case a central occupancy counter is required to receive signals of entry and departure from more than one motion sensor located in different exit ways. The motion sensors in such application will be equipped with communication capacity to transmit incoming and outgoing motion signals for consolidation at the central occupancy counter, which could be a useful device for home automation management.

Figure 9A:
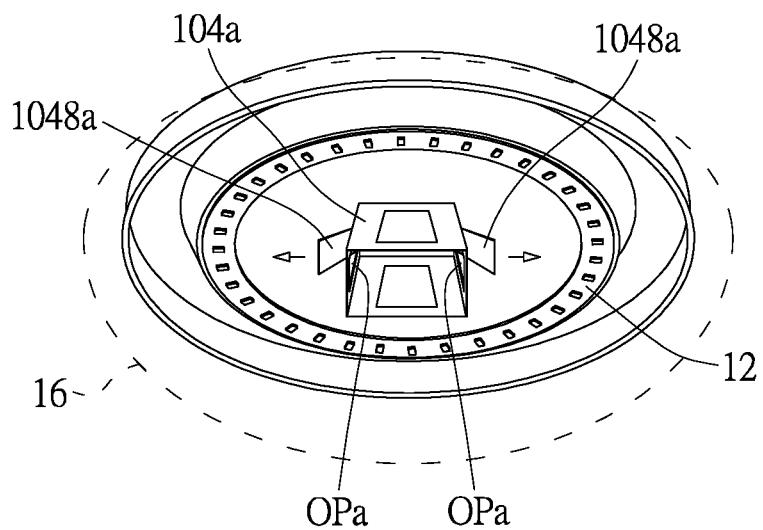
FIG. 9A is a schematic diagram of illumination apparatus with microwave motion sensor operated with two opposite window gates/reflectors opened for an indoor application as detection zone according to another embodiment of the present invention.
Figure 9B:
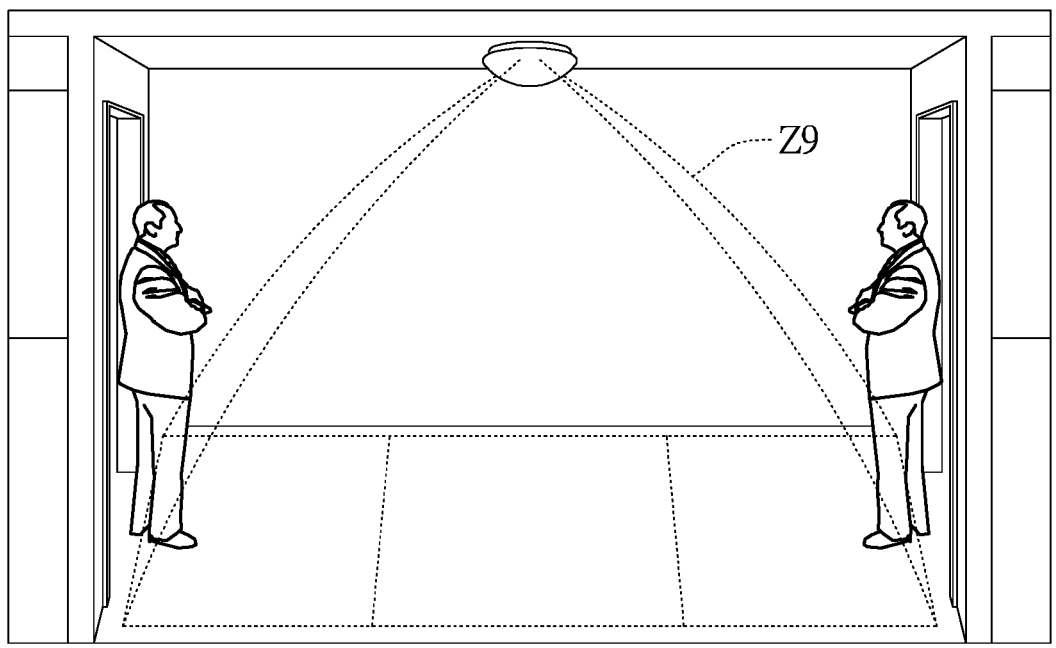
FIG. 9B according to the embodiment of FIG. 9A is an operating diagram of illumination apparatus with microwave motion sensor operated with two opposite window gates/reflectors opened for an indoor application as detection zone.

FIG. 9A is a schematic diagram of illumination apparatus with microwave motion sensor for indoor as detection zone according to another embodiment of the present invention. FIG. 9B according to the embodiment of FIG. 9A is an operating diagram of illumination apparatus with microwave motion sensor for indoor as detection zone. Please refer to FIGS. 9A and 9B.

FIG. 9A schematically illustrates the microwave confining unit 104, such as a metallic quadrangular body shaped with four pre-punched window gates 1048*a* facing different horizontal direction. Each pre-punched window gate 1048*a* could be pulled outward to form a window opening OPa to allow the microwave signal to pass through and extend its detection capacity along an opening direction of the window opening OP. FIG. 9B schematically illustrates the consequent pattern of the detection zone Z9 according to the embodiment of FIG. 9A.

In detail, FIG. 9A schematically illustrates two opposite pre-punched window gates 1048a which are pulled outward to form two window openings OPa in two opposite directions to allow the microwave signals to extend its detection capacity along the motion path in a hallway application. In the other embodiment, there are three window gates 1048a are pulled outward to form a three direction space for the microwave signal to extend its detection capacity along the three opening directions. A useful application of such embodiment will be for outdoor ceiling light to detect motion intrusion approaching the house from three directions while the motion inside the house will not trigger the outdoor ceiling light to turn on.

The difference between FIGS. 8A and 9A is just the shapes of microwave confining unit 104 and 104a. Thus, the scope of detection zone Z8 for FIG. 8A is approximately elliptical range. The scope of the detection zone Z9 for FIG. 9A is approximately rectangular range. FIG. 9A is ideal for detection work in a hallway space with extension need of specific direction for microwave detection. In the other words, there is no dead corner in FIG. 9B. The scope of the detection zone Z9 for hallway space is better than the scope of the detection zone Z8 for hallway space.

Figure 10A:
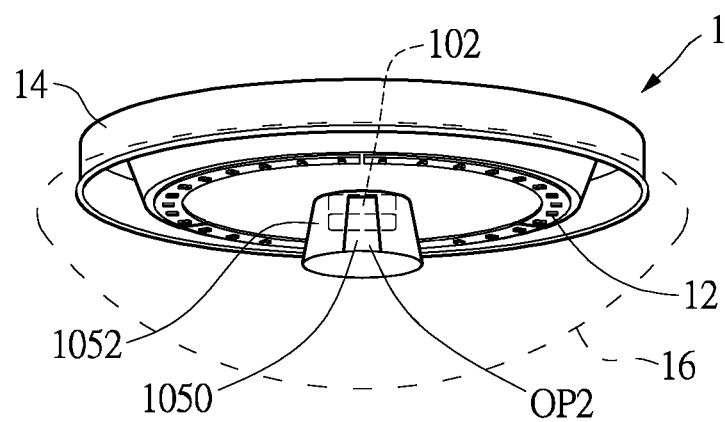
FIG. 10A and FIG. 10B are schematic diagrams of illumination apparatus with microwave motion sensor with a portion of metallic foil ripped off for a hallway application as detection zone according to another embodiment of the present invention.
Figure 10B:
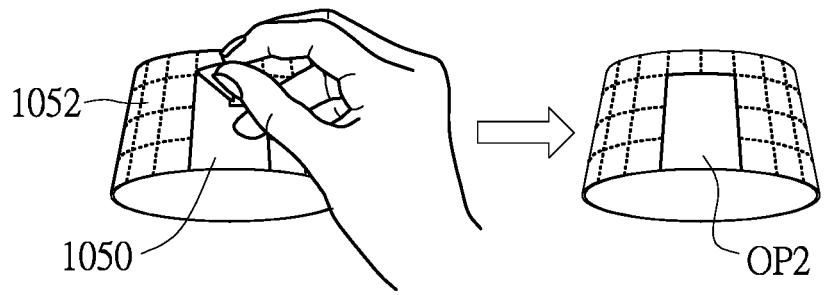
Figure 10C:
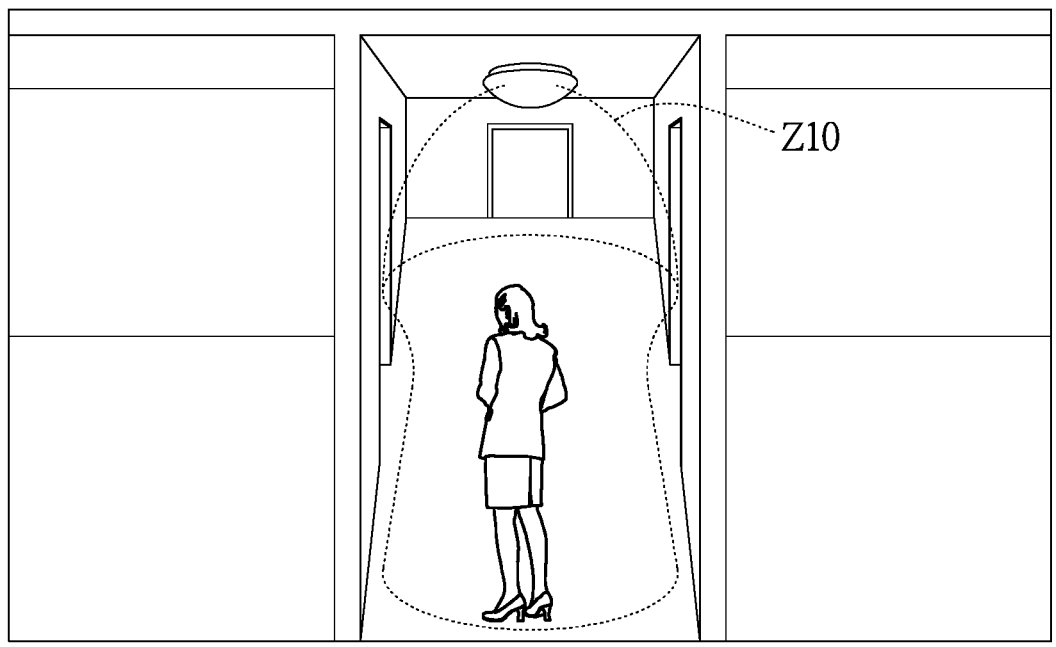
FIG. 10C according to the embodiment of FIGS. 10A and 10B is an operating diagram of illumination apparatus with microwave motion sensor for an indoor application as detection zone.

FIG. 10A is a schematic diagram of illumination apparatus with microwave motion sensor for hallway as detection zone according to another embodiment of the present invention. FIG. 10B according to the embodiment of FIG. 10A is an operating diagram of microwave confining unit. FIG. 10C according to the embodiment of FIGS. 10A and 10B is an operating diagram of illumination apparatus with microwave motion sensor for hallway as detection zone. Please refer to FIGS. 10A, 10B and 10C.

FIG. 10A schematically illustrates a non-metallic taper cylinder laminated with metallic foil 1052 such that the microwave signals are banned from passing through such metallic foil 1052. The metallic foil 1052 has a precut pattern of lattice design or any shape of window gate design, which can be partially ripped off to create window opening(s) OP2 for the microwave signals to pass through. In more detail, the microwave confining unit 104 is a non-metallic construction 1050 laminated with metallic foil 1052, for instance a cup of acrylic material laminated with metallic foil 1052.

This embodiment uses a reverse technique to produce the same effect as the microwave confining unit 104 with adjustable gate(s). FIG. 10B schematically illustrate the consequent patterns of detection zone with different number of metallic lattices being ripped off, which has the same effect of angle degree opened in FIG. 7A, 8A or 9A.

As can be known similarly, the user could also use stickers of metallic foil sheet provided by the manufacturer to cover a portion of the surface of the non-metallic cup as shown in FIG. 10B. The microwave sensing unit 102 is not able to detect motion along the direction space of the metallic foil 1052 that they do not need the microwave sensing unit 102 to perform detecting function. The advantage of such work is it can be done inside the illumination apparatus 1 and the external appearance is not affected.

Figure 11A:
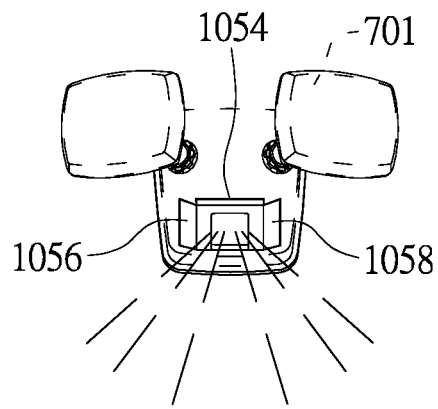
FIG. 11A is a schematic diagram of illumination apparatus with microwave motion sensor for an outdoor application as detection zone according to another embodiment of the present invention.
Figure 11B:
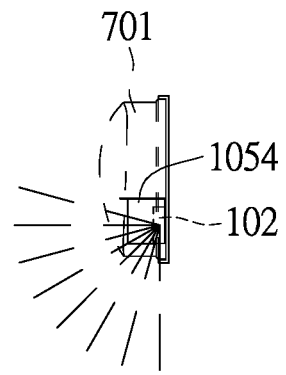
FIG. 11B is a side view of FIG. 11A.
Figure 11C:
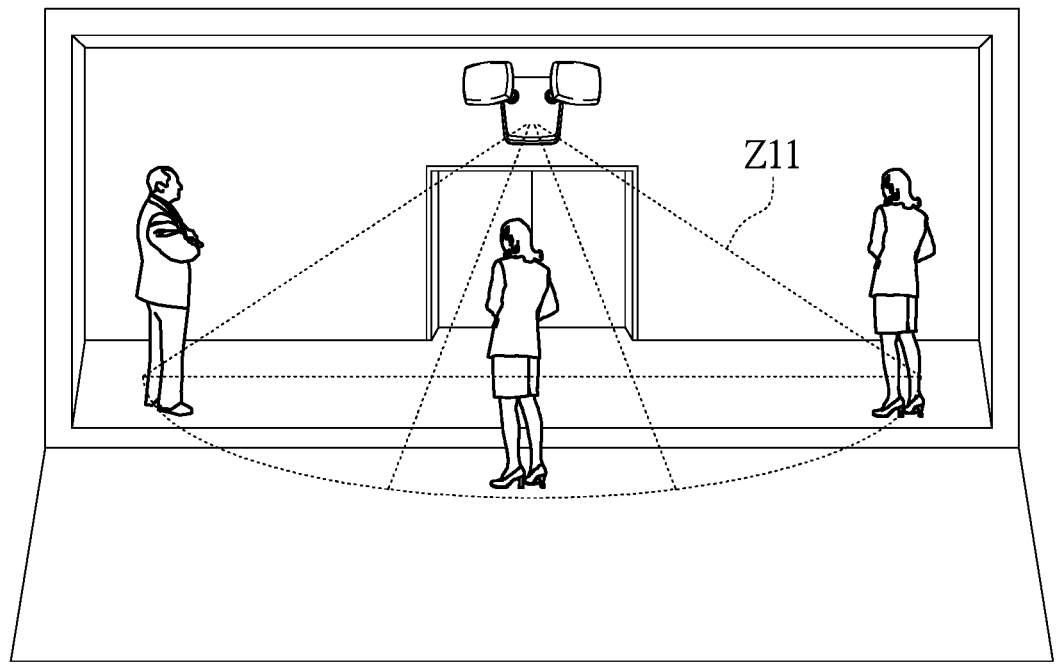
FIG. 11C according to the embodiment of FIG. 11A is an operating diagram of illumination apparatus with microwave motion sensor for an outdoor application as detection zone.

FIG. 11A is a schematic diagram of illumination apparatus with microwave motion sensor for a wall area as detection zone according to another embodiment of the present invention. FIG. 11B is a side view of FIG. 11A. FIG. 11C according to the embodiment of FIG. 11A is an operating diagram of illumination apparatus with microwave motion sensor. Please refer to FIGS. 11A, 11B and 11C. For explanation convenience, the illumination apparatus 1 of the present embodiment is applied to a wall lantern, and more particularly to a security light. The microwave confining unit 104 comprises a plurality of metallic reflectors 1054, 1056 and 1058 such as three gates construction.

FIGS. 11A and 11B schematically illustrates the microwave sensing unit 102 installed inside the plastic housing 701 of the wall lantern.

The microwave sensing unit 102 is positioned inside the microwave confining unit 104 composed of three gates construction which comprises one top control gate, one left control gate and one right control gate. The opening angle of the top control gate is for confining the vertical span of the microwave detection zone Z11. The opening angles of the two side control gates individually or jointly confine the horizontal span of the detection zone Z11. FIG. 11C illustrates the pattern of detection zone Z11 with one assortment of angles opened with respect to the three control gates. The one skilled in the art according to the actual needs may freely design the quantity of control gates or the opening angles of anyone of three gates construction.

Figure 12A:
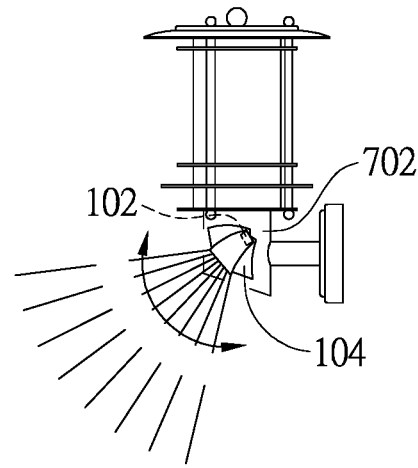
FIG. 12A is a schematic diagram of illumination apparatus with an angle adjustable microwave motion sensor according to another embodiment of the present invention.
Figure 12B:
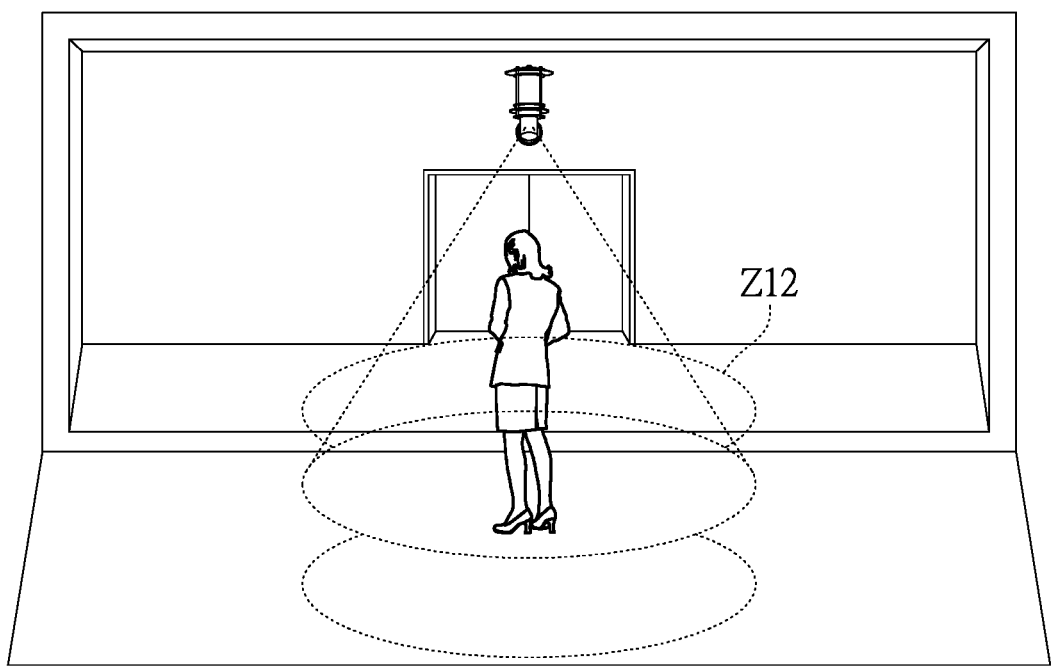
FIG. 12B according to the embodiment of FIG. 12A is an operating diagram of illumination apparatus with microwave motion sensor.

FIG. 12A is a schematic diagram of illumination apparatus with microwave motion sensor according to another embodiment of the present invention. FIG. 12B according to the embodiment of FIG. 12A is an operating diagram of illumination apparatus with microwave motion sensor. Please refer to FIGS. 12A and 12B. For explanation convenience, the illumination apparatus 1 of the present embodiment is applied to a wall lantern and the microwave confining unit 104 is a cone shaped metal cup.

For example, the microwave sensing unit 102 is positioned inside the cone shaped metal cup which in turn is installed inside a plastic housing 702 of the outdoor wall lantern. The cone shaped metal cup is designed with a swivel structure to allow angle adjustment so that the detection angle of the microwave sensing unit 102 is manageable.

When the cone shaped metal cup rotates downward, the microwave sensing unit 102 follows rotation of the cone shaped metal cup. Thus, the detection zone Z12 of the microwave sensing unit 102 will be adjusted to the area in front of the user of FIG. 12B. When the cone shaped metal cup rotates upward, the microwave sensing unit 102 follows rotation of the cone shaped metal cup. Thus, the detection zone Z12 of the microwave sensing unit 102 will be adjusted to the area behind the user of FIG. 12B. The implementation of the microwave confining unit 104 and the microwave sensing unit 102 is not limited in the present embodiment.

Figure 13A:
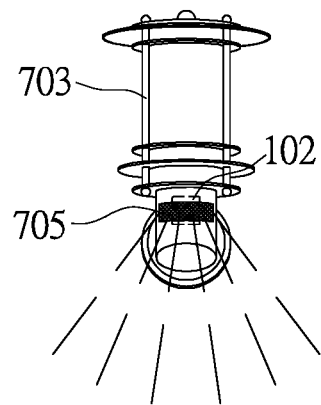
FIG. 13A is a schematic diagram of illumination apparatus with microwave motion sensor according to another embodiment of the present invention.
Figure 13B:
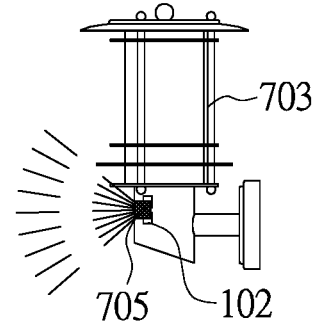
FIG. 13B is a side view of FIG. 13A.
Figure 13C:
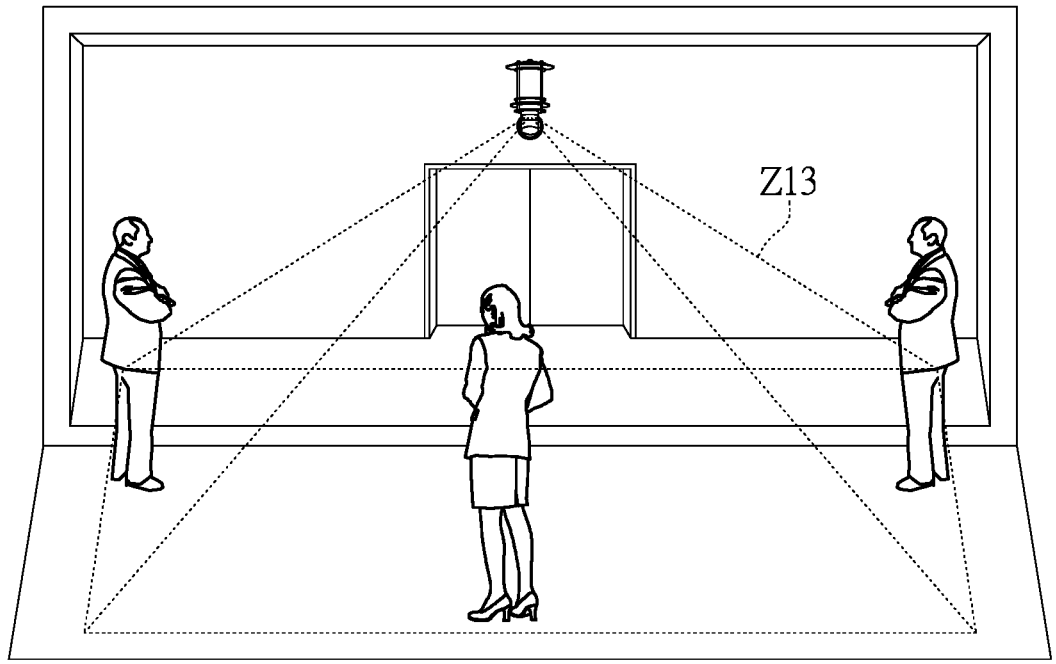
FIG. 13C according to the embodiment of FIG. 13A is an operating diagram of illumination apparatus with microwave motion sensor.

FIG. 13A is a schematic diagram of illumination apparatus with microwave motion sensor according to another embodiment of the present invention. FIG. 13B is a side view of FIG. 13A. FIG. 13C according to the embodiment of FIG. 13A is an operating diagram of illumination apparatus with microwave motion sensor. Please refer to FIGS. 13A, 13B and 13C. FIGS. 13A and 13B schematically illustrates the illumination apparatus 1 with a microwave sensing unit 102 built inside a metallic housing 703 which has a non-metallic window slot covered with a plastic cap 705.

For example, the illumination apparatus 1 of the present embodiment is applied to a wall lantern. The microwave sensing unit 102 is directly installed inside the metallic housing 703 of the wall lantern. Therefore, the microwave confining unit 104 of the present embodiment is the metallic housing 703 which has the non-metallic window slot covered with a plastic cap 705. The metallic housing 703 of the wall lantern is designed with the window slot covered with the plastic cap 705 so that the microwave sensing unit 102 sitting behind the window slot could perform motion detection or intrusion detection through the window slot.

The horizontal angle span and the height of the window slot determine the scope of detection zone Z13 of the microwave sensing unit 102. The distance between the window slot and the microwave sensing unit 102 also affects the dimension of the detection zone Z13. Additionally the vertical position of the microwave sensing unit 102 relative to the window slot can determine the vertical angle of the detection zone Z13. The implementation of the microwave confining unit 104 and the microwave sensing unit 102 is not limited in the present embodiment, and the one skilled in the art may freely design it according to the actual needs.

Figure 14A:
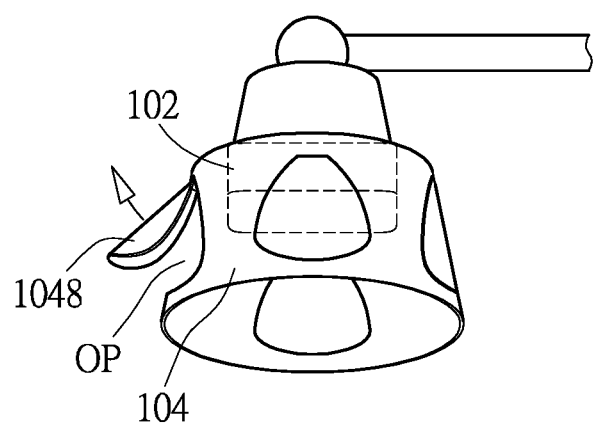
FIG. 14A is a schematic diagram of microwave motion sensor according to another embodiment of the present invention.
Figure 14B:
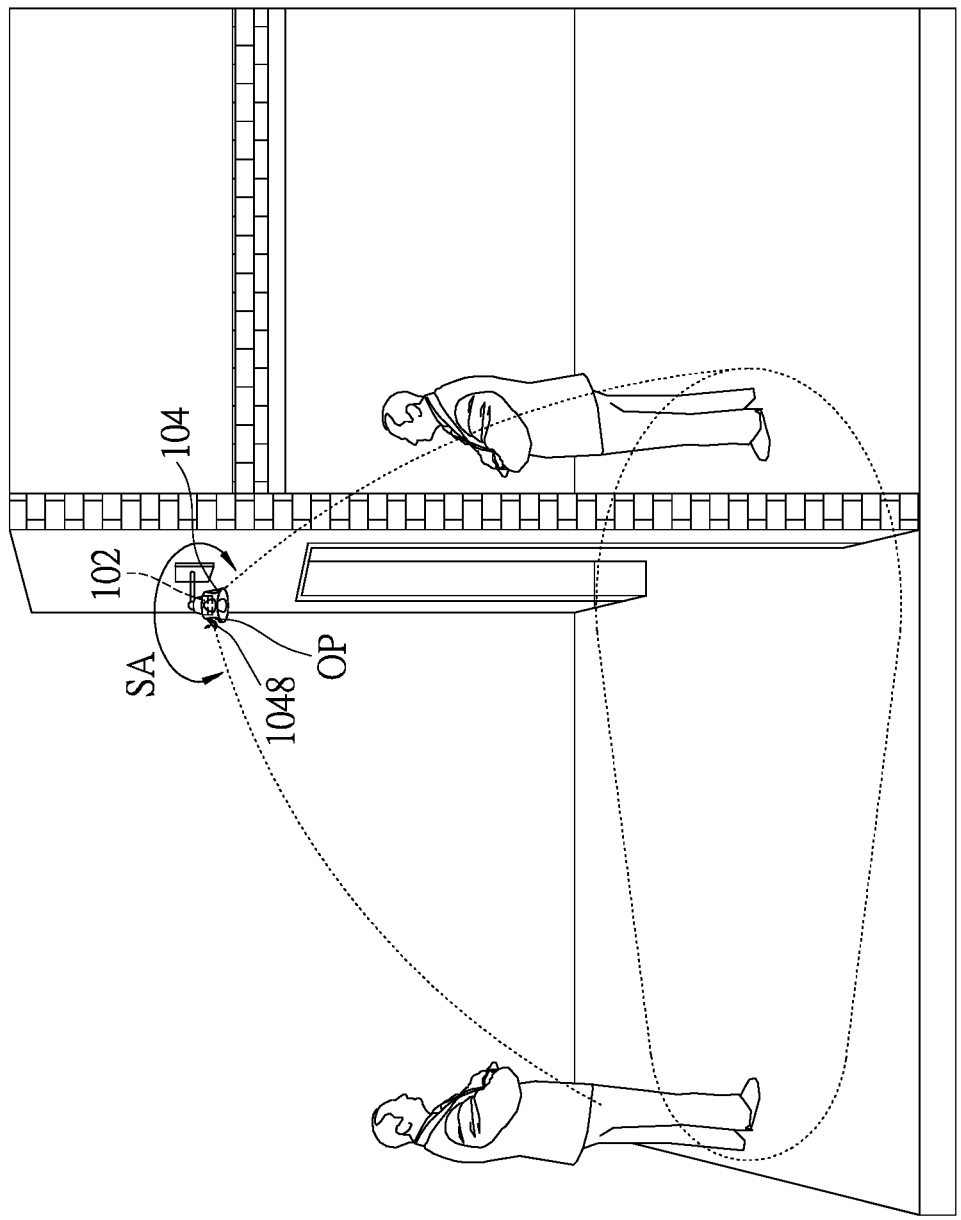
FIG. 14B and FIG. 14C is another schematic diagram of microwave motion sensor according to the embodiment of FIG. 14A.
Figure 14C:
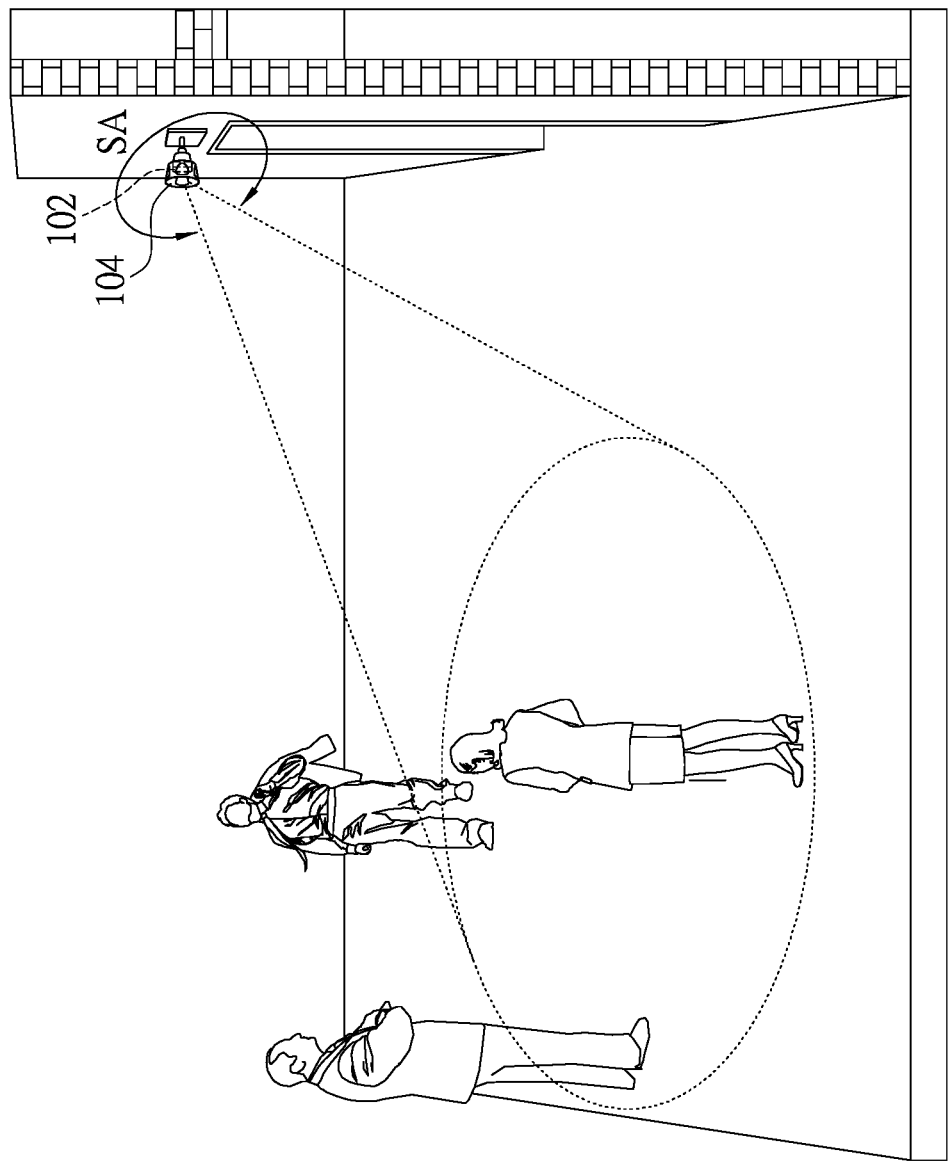

FIG. 14A is a schematic diagram of microwave motion sensor according to another embodiment of the present invention. FIG. 14B is another schematic diagram of microwave motion sensor according to the embodiment of FIG. 14A. FIG. 14C is another schematic diagram of microwave motion sensor according to the embodiment of FIG. 14A. Please refer to FIGS. 14A, 14B and 14C.

As shown as FIG. 14A, the microwave motion sensor is structurally separated from the illumination apparatus or the home appliances. The microwave motion sensor according to the Doppler Effect can be used to develop an occupancy detector for home automation to manage the on/off performance of illumination apparatus, home appliances such as air conditioners, ceiling fans, audio/video instruments, and home security system. When an object is approaching the microwave motion sensor.

As shown as FIG. 14A, the foldable window gate construction of the microwave confining unit 104 is the first embodiment for the design of an occupancy detector; When one of the foldable window gates 1048 of the microwave confining unit 104 is pushed outward to create an extended detection zone along the direction of entry door path. It can be used to detect the incoming and outgoing frequency passing through the entryway area of a room and thereby to calculate the number of people staying in a room at any time.

The art as shown in FIGS. 14A, 14B and 14C illustrates the microwave motion sensor as an occupancy detector. In the other embodiment, occupancy detector is integrated with an illumination module. In fact, the occupancy detector can be by its self-coupled with a wireless communication capacity to control remote load(s) using the numerical value as a controlling parameter. The art of FIG. 14A with or without light is for installation in the center of a living space. If the occupancy detector with or without light is for installation near by the exit door, the shape of the microwave confining unit 104 needs to be designed to detect only the outward space facing exit door such that the motion activities inside the living space are insulated from detection. This can be done by making the back portion of the microwave confining unit 104 vertically straight and extended so that the microwave signal can't pass through to detect the motion activities in the living space behind the occupancy detector. Alternatively, the microwave confining unit 104 can be installed with a swivel kit to make the microwave confining unit 104 angle adjustable as shown in FIG. 4B, wherein the microwave confining unit 104 is angled outward such that only incoming motion or outgoing motion is detected.

If instead the microwave confining unit 104 is a metallic cone shape with a swivel structure to allow angle adjustment to confine the detection zone of the microwave sensing unit 102 to only the entryway motion path as shown in FIG. 14C, the probability of wrong signal judgment can be meaningfully avoided.

Figure 15A:
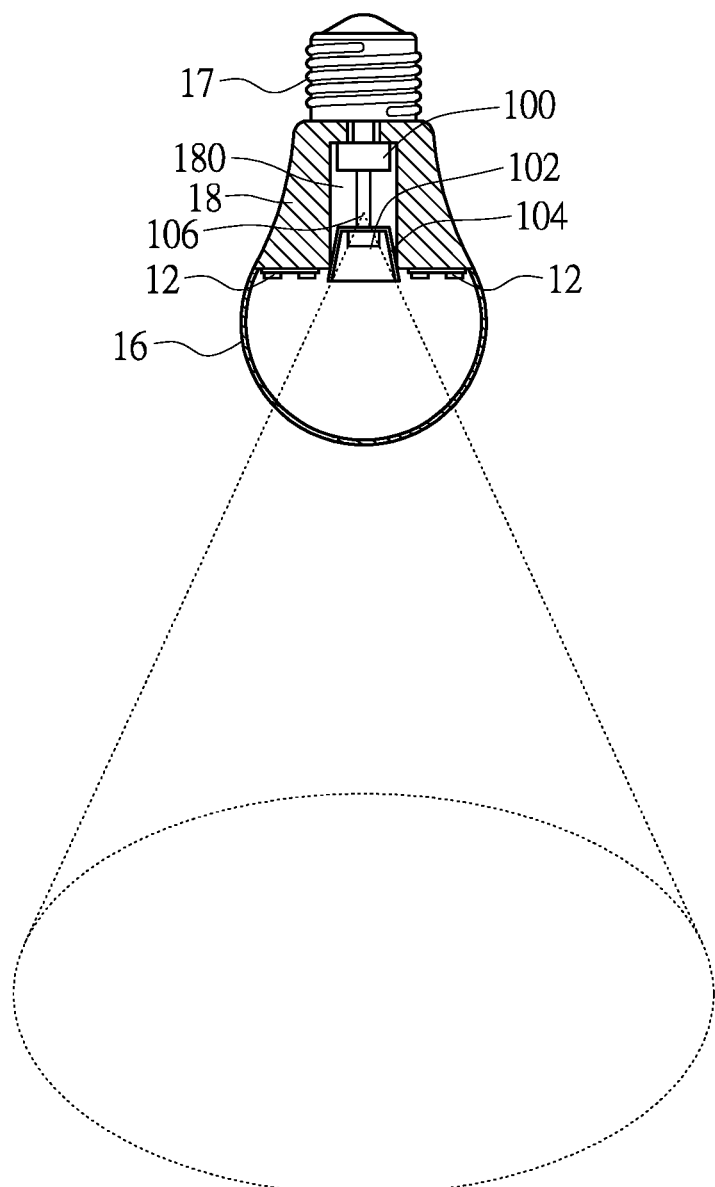
FIG. 15A is another schematic diagram of a LED light bulb with microwave motion sensor.

FIG. 15A is another schematic diagram of a LED light bulb 3 with microwave motion sensor. As shown in FIG. 15A which schematically illustrates another embodiment of the present invention; the microwave motion sensor of the present invention is integrated with a LED illumination module to become a LED light bulb 3 with a motion sensing capacity. The dotted pattern represents the microwave detection zone confined by a microwave confining unit 104, the spreading effect of the microwave sensor is now under a good control.

The illumination apparatus further comprises a base 17, a non-metallic heat dissipation structure 18 and a light diffuser 16, wherein the illumination apparatus is a LED light bulb 3 with a built-in microwave motion sensor. The non-metallic heat dissipation structure 18, for instance, out of ceramic, graphite, or composite material, is for conducting or reducing the thermal temperature of the illumination module 12. The base 17 is connected to the light diffuser 16 and the non-metallic heat dissipation structure 18. The base 17 with screw thread is coupled to the lamp holder. The illumination module 12 is disposed on the non-metallic heat dissipation structure 18 that installed behind the light diffuser 16. The non-metallic heat dissipation structure 18 has a cave 180 for accommodating the microwave confining unit 104 and the microwave sensing unit 102.

Figure 15B:
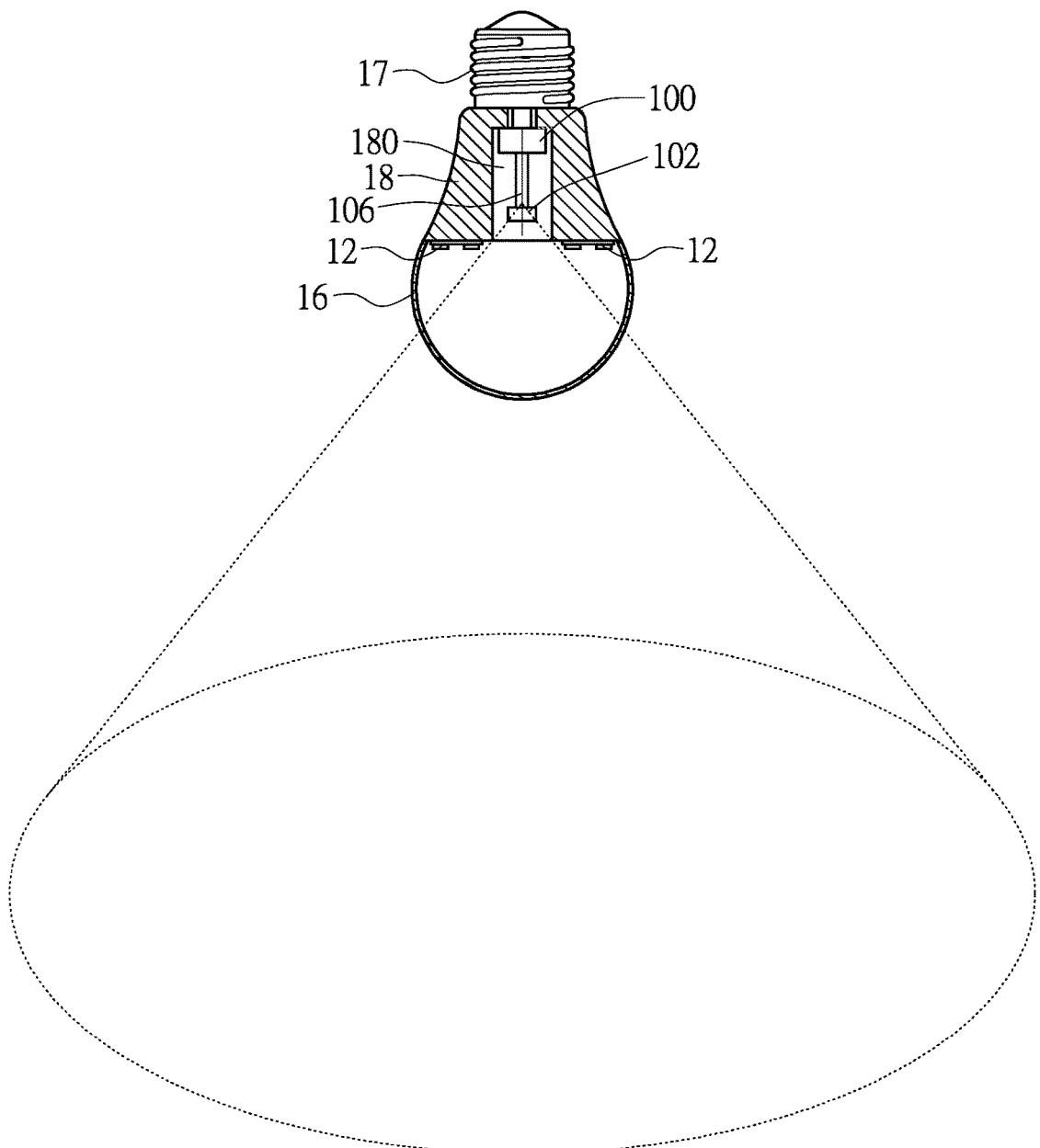
FIG. 15B is another schematic diagram of a LED light bulb with microwave motion sensor.

In another embodiment, the LED light bulb 3 without the microwave confining unit 104 of FIG. 15A has the metallic heat dissipation structure. As shown in FIG. 15B, the metallic heat dissipation structure 18 has both functions of heat dissipation and microwave confining. In the other word, the metallic heat dissipation structure 18 can be used as a microwave confining unit to accommodate the microwave sensing unit 102. The illumination module 12 is disposed on the metallic heat dissipation structure 18. Further, window opening(s) can be constructed on the side wall of the heat dissipation structure 18 to render microwave signal passing through to extend the microwave detection along the direction of window opening(s).

In summary, the present invention provides a microwave motion sensor. The microwave motion sensor manages the motion path of the microwave signal based on the use of the microwave confining unit. The microwave confining unit is for adjusting the scope of the detection zone. In addition, an adjustable means can be added and integrated with the microwave sensing unit such that the microwave sensing unit or the microwave confining unit can be pushed up or pulled down in the accommodating space of the microwave confining unit to park at a desired position for determining the scope of the microwave detection zone. The scope of the detection zone of the microwave signal may vary based on the disposed position of the microwave sensing unit and the construction of the microwave confining unit, and the construction of the microwave confining unit may vary based on the predetermined space. Accordingly, the microwave motion sensor with microwave confining design or the illumination apparatus incorporating with the microwave motion sensor of the present invention exhibits enhanced convenience.

The above-mentioned descriptions represent merely the exemplary embodiment of the present disclosure, without any intention to limit the scope of the present disclosure thereto. Various equivalent changes, alterations or modifications based on the claims of present disclosure are all consequently viewed as being embraced by the scope of the present disclosure.

Different from the conventional PIR (passive infrared ray) motion sensors using an infrared ray detector to detect movement of infrared ray/heat generating object such as human being the microwave motion sensors and the ultrasonic motion sensors use a different approach to detect motion of a moving object which does not have to be an infrared ray generating object. The different approach is a technology involving use of wave characteristics and the Doppler Effect to design a software to identify a motion intrusion in a living space; whenever a transmitting wave hits an object, a portion of the wave power is reflected back and received by the wave generating source, so called "echoed signal", wherein if the object reflecting the transmitting wave is a non-moving object relative to the wave generating source the frequency of the echoed signal will remain unchanged, wherein if the object is approaching the wave generating source, the frequency of the echoed signal received and measured by the wave generating source will become higher than the original frequency generated by the wave generating source, wherein if the object is leaving the wave generating source, the frequency of the echoed signal received and measured by the wave generating source will become lower than the original frequency generated by the wave generating source. Such phenomenon is so called "the Doppler Effect" which is popularly used for detecting a moving body in a detection zone. Such feature of frequency variation by the Doppler Effect is the technical foundation for constructing both a microwave motion sensor and an ultrasonic motion sensor. Between the microwave motion sensor and the ultrasonic motion sensor the application of the Doppler Effect for designing any software algorithm for performing lighting control has no functional differences, whatever software algorithm involving application of the Doppler Effect designed for operating the microwave motion sensor is equally applicable to the ultrasonic motion sensor. With this being said the software algorithm disclosed in the original main text from section [00122] thru section [00135] is also workable for the ultrasonic motion sensor and we can simply replace the words "microwave motion sensor" with "ultrasonic motion sensor" or even use the words "motion sensors" as a common phrase representing either a microwave motion sensor or the ultrasonic motion sensor.

Microwaves are a form of electromagnetic radiation which does not rely on any medium for power transmission while ultrasonic waves on the other hand require a medium for power transmission. The microwave can propagate in a vacuum space but the ultrasonic wave can not transmit in the same vacuum space. The ultrasonic wave can transmit in a single medium of solid, liquid or air but it can not pass thru a junction between two different transmission media such as air and concrete wall. Such feature actually makes the ultrasonic wave a better technology to replace the microwave for operating occupancy detection to control on/off performance of a lighting apparatus. The wall penetration capacity of the microwave is a great feature enabling the operation of wireless communication such as the mobile phone otherwise all wireless communication applications can not survive. The application of microwave motion detection in lighting control is only a negligible part of overall business interest. In the first application of the present invention efforts were made to deal directly with the wall penetration problem of the microwave by introducing a confining shade to define a manageable detection zone. In the second continuation application of the present invention an option of using a higher frequency over 20 GHz was provided as a solution to substantially minimize the wall penetration effect for operating an occupancy counting software program for controlling the on/off performance of a lighting apparatus or an electrical appliance. In the present continuation in part application the ultrasonic motion sensor is enrolled in the picture as a better option for operating the occupancy counting software program for controlling the on/off performance of a lighting apparatus or an electrical appliance. The critical technology of using the Doppler Effect to judge between an incoming signal and an outgoing signal together with a software of occupancy counting algorithm to control the on/off performance of a lighting apparatus or electrical appliance remain unchanged with no new matter introduced. In the previous second application of the invention the title of invention was changed by the Office to "Microwave motion sensing technology and its application thereof" to more meaningfully match with the content of the invention. In the present application the title of invention is further changed to "Occupancy based lighting control technology and its application thereof" which shall more adequately represent the content of the present invention as microwave in fact is only an option and the ultrasonic motion sensor can even perform better than the microwave motion sensor.

The technology using Doppler Effect to differentiate between an incoming motion signal and an outgoing signal in a living space and to operate the occupancy counting software program for controlling on/off performance of a lighting load or an electrical appliance can be equally applied to both a microwave motion sensor and an ultrasonic motion sensor. The microwave is an electromagnetic wave with much higher penetration effect into space than that of the ultrasonic wave. Such difference of transmission feature makes the ultrasonic wave much more suitable means for operating motion sensing function without the hassle of having to deal with a wall penetration problem like microwave. In fact when used for motion sensing the ultrasonic wave has at least two advantages over the microwave; first the ultrasonic motion sensor can be operated at very low frequencies with much lower production and operating cost, typically between 30 kHz to 50 kHz only while the microwave is required to operate with a frequency higher than 20 GHz in order to mitigate the wall penetration problem, second there is no wall penetration problem to overcome so the detection is automatically confined in a detection zone formed by a living space.

What is claimed is:

1. An occupancy detecting method for controlling a turned on state or a turned off state of an electrical apparatus in a living space comprising:
   using a motion sensor including a transmitter for transmitting a wave signal, a receiver for receiving an echoed signal of the wave signal reflected from a moving human body in a detection zone, and a sensing circuitry for detecting a human motion;
   using a controller circuitry to analyze a time duration and a frequency pattern of the echoed signal generated by the human motion in the living space;
   wherein if the time duration of the echoed signal is shorter than a preset minimum time length, the echoed signal is considered as a local random motion signal;
   wherein if the time duration of the echoed signal is longer than the preset minimum time length and the frequency pattern of the echoed signal is higher than the frequency pattern of the wave signal transmitted, the echoed signal is judged as an incoming motion signal;
   wherein if the time duration of the echoed signal is longer than the preset minimum time length and the frequency pattern of the echoed signal is lower than the frequency pattern of the wave signal transmitted, the echoed signal is judged as an outgoing motion signal;

using an occupancy counting software program to record the incoming motion signal and the outgoing motion signal and to operate an algorithm of arithmetic calculation with respect to the human motions detected in the living space for establishing or updating a numerical value account to register occupant number;

wherein if the echoed signal is judged as the outgoing motion signal, the numerical value account is deducted by 1;

wherein if the echoed signal is judged as the incoming motion signal, the numerical value account is added by 1;

wherein if the echoed signal is judged as the local random motion signal, the numerical value account remains unchanged;

wherein a balance value or an updated numerical value of the numerical value account represents the number of occupants remaining in the living space;

using the numerical value account following an update by a new human motion detected as a decision making parameter to activate the controller circuitry for controlling the turned on state and the turned off state of the electrical apparatus;

wherein whenever an echoed signal is detected by the receiver at a time when the balance value of the numerical account is at zero, the controller circuitry manages to instantly add 1 to the balance value of the numerical account and simultaneously turn on the electrical apparatus;

wherein whenever the balance value of the numerical value account or the updated numerical value of the numerical value account becomes zero, the controller circuitry operates to perform a delay shut off process to turn off the electrical apparatus after a predetermined time period; and wherein whenever the balance value of the numerical value account or the updated numerical value of the numerical value account is greater than zero, the controller circuitry turns on or continues to turn on the electrical apparatus.

2. The occupancy detecting method according to claim 1, wherein the occupancy counting software program further includes an arrangement such that when a new human motion is further detected in the living space during the predetermined time period in the delay shut off process, the numerical value account is immediately adjusted by adding 1 and consequently the delay shut off process is instantly terminated with the electrical apparatus continues in the turned on state; and wherein the arrangement represents a false judgment correction action.

3. The occupancy detecting method according to claim 1, wherein when the preset minimum time length is missing or undefined, the controller circuitry operates a time delay mode to control a turned on duration of the electrical apparatus activated by the motion sensor, at the same time the controller circuitry activates a learning algorithm to search a minimum time length of the outgoing motion signal;

wherein when the electrical apparatus is turned off upon a maturity of the time delay and no further human motion is detected after a long period of time indicating no occupant remaining in the living space, the time length of a last outgoing motion signal is recorded as the preset minimum time length for judging the echoed signal being the incoming motion signal, the outgoing motion signal or the local random motion signal.

4. The occupancy detecting method according to claim 1, wherein the motion sensor is a microwave motion sensor designed to operate at a frequency below 20 GHz, wherein a microwave confining device is required to limit a detecting capacity of the microwave motion sensor within the living space to eliminate a wall penetration effect.

5. The occupancy detecting method according to claim 1, wherein the motion sensor is a microwave motion sensor designed to operate at a frequency equal to or higher than 20 GHz, wherein a microwave confining device is not required.

6. The occupancy detecting method according to claim 1, wherein the motion sensor is an ultrasonic motion sensor.

7. The occupancy detecting method according to claim 1, wherein the electrical apparatus is a lighting apparatus.

8. The occupancy detecting method according to claim 1, wherein the electrical apparatus is a ceiling fan.

9. The occupancy detecting method according to claim 1, wherein the electrical apparatus is an air conditioner.

10. The occupancy detecting method according to claim 1, wherein the electrical apparatus is a radio or a television.

11. The occupancy detecting method according to claim 7, wherein the delay shut off process is designed with a two-stage approach; wherein for the first stage of the delay shut off process, the controller circuitry manages to instantly reduce the illumination level of the lighting apparatus to a noticeable low level and continues the noticeable low level for a first short time interval, wherein for the second stage of the delay shut off process, the controller circuitry operates to turn off the lighting apparatus upon the maturity of the predetermined time period.

12. The occupancy detection method according to claim 11, wherein for the second stage of the delay shut off process, the controller circuitry operates to gradually turn off the lighting apparatus.

13. The occupancy detection method according to claim 7, wherein the delay shut off process is designed to dim the lighting apparatus after the predetermined time period, wherein the controller circuitry operates to switch the lighting apparatus from a high-level illumination state to a low-level illumination state and to continue the low-level illumination state until a new echoed signal is detected.

* * * * *